(12) United States Patent
Beshai

(10) Patent No.: US 7,639,678 B2
(45) Date of Patent: Dec. 29, 2009

(54) MULTIMODAL DATA SWITCH

(75) Inventor: Maged E. Beshai, Stittsville (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1093 days.

(21) Appl. No.: 11/002,398

(22) Filed: Dec. 2, 2004

(65) Prior Publication Data
US 2006/0123162 A1 Jun. 8, 2006

(51) Int. Cl.
*H04Q 11/00* (2006.01)
(52) U.S. Cl. .................. 370/369; 370/370; 370/372; 370/375; 370/380
(58) Field of Classification Search .................. None
See application file for complete search history.

(56) References Cited

U.S. PATENT DOCUMENTS

| | | | | |
|---|---|---|---|---|
| 5,168,492 A * | 12/1992 | Beshai et al. | ............... | 370/353 |
| 5,649,217 A * | 7/1997 | Yamanaka et al. | ............. | 710/52 |
| 6,839,794 B1 * | 1/2005 | Schober | ................... | 710/316 |
| 7,023,856 B1 * | 4/2006 | Washabaugh et al. | .... | 370/395.1 |
| 7,177,328 B2 * | 2/2007 | Miller | ................... | 370/503 |
| 2003/0016686 A1 * | 1/2003 | Wynne et al. | ............... | 370/412 |
| 2003/0206554 A1 * | 11/2003 | Dillon | ................... | 370/432 |
| 2004/0081184 A1 * | 4/2004 | Magill et al. | ............... | 370/413 |
| 2005/0232274 A1 * | 10/2005 | Kadambi et al. | ............ | 370/392 |
| 2006/0168337 A1 * | 7/2006 | Stahl et al. | ................... | 709/240 |

* cited by examiner

*Primary Examiner*—Daniel J. Ryman
*Assistant Examiner*—Tito Pham
(74) *Attorney, Agent, or Firm*—Anderson Gorecki & Manaras LLP

(57) ABSTRACT

A transit memory assembly of a rotator-based switching node is logically partitioned into two sections, one operated as a common-memory switch fabric and the other as a time-shared space-switch fabric. The composition of data received at input ports of the switching node determines adaptive capacity division between the two sections. Based on an indication of traffic type, a controller of at least one input port selects one of the two sections. The space-switch section enables scalability to a high transport capacity while the common-memory section enables scalability to a high processing throughput. The switching node includes rotators and a bank of transit-memory devices that facilitate the incorporation of any mixture of periodic, aperiodic, contention-free exclusive-access, concurrent-access, and multicast switching.

25 Claims, 20 Drawing Sheets

MULTIMODAL DATA SWITCH

FIELD OF THE INVENTION

The present invention relates to multi-service switching nodes and, more particularly, to an architecture and a control mechanism of a multimodal electronic switch.

BACKGROUND

The conventional common-memory data switch has the advantages of extreme simplicity, high-performance, ease of multicasting, and ease of scheduling in comparison with other data switches. In a common-memory switch, each input port has exclusive access to a common memory over a designated interval in a time frame and, similarly, each output port has exclusive access to the common memory during a designated interval in the time frame. The total capacity, in bits per second, of the common memory switch is therefore determined by the width and the access time (read and write) of the common memory. In a symmetrical switch, the total capacity is the capacity of the input side or the output side of the switch. To realize a capacity of 640 gigabits per second, for example, using a memory of access time (read and write) of 20 nanoseconds, the memory width would be 12.800 kilobits (1.6 Kilobytes). When an input port accesses the common memory, it writes a data block destined to at least one output port. In order to fully use the capacity of the switch, the size of the data block should be equal to the width of the common memory. The time required to form, at an input port, a data block directed to an output port can be excessive when the flow rate of a data stream from an input port to an output port is relatively low. A requirement to keep the data-block formation below an acceptable value may limit the scalability of the common-memory switch. Thus, while scheduling and control simplicity of a common-memory switch would facilitate capacity growth, the scalability of the switch is determined primarily by the switching fabric limitation.

Well-known conventional switch structures based on time-shared space switches would allow the construction of a switching fabric of high capacity. However, the scalability of such structures may be limited by scheduling and control complexity.

The main advantage of the common-memory switch is the absence of internal contention which facilitates scheduling and improves performance. The main advantage of the space-switch is the ease of expansion to high fabric capacities. The main limitation of the common-memory switch is fabric scalability in terms of the number of ports. The main limitation of the time-shared space switch is the scheduler scalability. A common-memory fabric is suitable for data streams of high flow rates while a time-shared-space-switch fabric is suitable for data streams of relatively low flow rates. In order to provide a data network serving data streams of widely varying flow rates and different service requirements, a switching-node structure that combines the advantages, and circumvents the limitations, of the common-memory structure and the space-switch-based structure is needed.

SUMMARY

A switching node of a homogeneous fabric functions as a combined common-memory switch and time-shared space switch serving data streams of widely-varying flow rates. The combined switch serves aperiodic variable-rate data and periodic data in both fine and coarse granularities and in both unicast and multicast modes.

In accordance with an aspect of the present invention, there is provided a switch comprising: a plurality of input ports; a plurality of output ports; and a plurality of transit-memory devices each transit-memory device cyclically connecting to each of the input ports and output ports during a predefined time-slotted frame. Each transit-memory device is logically partitioned into a first group of primary memory divisions each for holding a data segment from any of the input ports destined to any of the output ports; and a second group of secondary memory divisions having a one-to-one correspondence to the output ports. The primary memory divisions are arranged into memory blocks each memory block including one primary memory division from each transit-memory device, and each memory block is allocable to hold a data block that includes at least one data segment written by a single input port and destined to at least one output port.

The switch further comprises: a plurality of transit-memory controllers each transit-memory controller associated with each of the transit-memory devices; and a master controller communicatively coupled to each of the input ports and each of the transit-memory controllers.

In accordance with another aspect of the present invention, there is provided a switch comprising: a plurality of input ports for receiving input data and organizing the input data into data segments; a plurality of output ports for transmitting output data; a plurality of transit memory devices; a plurality of transit-memory controllers, each transit-memory controller associated with a specific transit memory device; an input rotator operable to cyclically connect each input port to each transit memory device; an output rotator operable to cyclically connect each transit memory device to each output port; and a master controller communicatively coupled to each of the input ports and each of the transit-memory controllers.

Each transit-memory controller is operable to allocate a dedicated memory division in the specific transit memory device to each output port for receiving from any input port a data segment destined to the each output port, thereby realizing concurrent-access switching. Each transit-memory controller is also operable to reserve a prescribed number of floating memory divisions in the specific transit memory device, each floating memory division for receiving from any input port a data segment destined to at least one output port.

The master controller is operable to allocate at least one array of floating data divisions, each array including one floating memory division from each transit memory device, for transferring a data block from a selected input port to at least one output port, the data block including a number of data segments not exceeding the number of the transit memory devices, thereby realizing exclusive-access switching.

In accordance with a further aspect of the present invention, there is provided a method of scheduling transfer of time-slotted signals from a plurality of input ports to a plurality of output ports through a number of transit memories. The method comprises steps of: associating, during each time slot in a time-slotted frame, each input port with a corresponding one of the transit memories; creating a first matrix having a number of rows equal to the number of transit memories and a number of columns equal to the number of input ports, with each entry in the first matrix indicating a corresponding input-port occupancy state; creating a second matrix having a number of rows equal to the number of transit memories and a number of columns equal to the number of output ports with each entry in the second matrix indicating a corresponding output-port occupancy state; and matching entries in the first matrix and the second matrix in response to a request to transfer signals over a specified number of time slots from a specified input port to a specified output port within the time-slotted frame.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Exclusive-access Switch

A communications switch comprises a plurality of input ports and a plurality of output ports interconnected by a switching fabric. Any input port may connect to any output port, or to several output ports, and the connectivity pattern may change with time. The switching fabric may comprise memory devices, memoryless space switches, or a combination of memory devices and memoryless space switches.

In a switch structure known as a common-memory switch, the switch fabric includes a bank of random-access memory devices, together forming a wide memory, also called a common memory. In the common-memory switch, each input port has an exclusive write access to the wide memory during a designated interval of time within an arbitrarily specified time frame. Likewise, each output port has an exclusive read-access to the wide memory during a designated interval of time within the time frame. At any instant of time, only one input port or only one output port may have access to the wide memory. Thus, the wide-memory access is contention free. During a common-memory access cycle, each of a plurality of input ports accesses the common memory to write a data segment and each of a plurality of output ports accesses the common memory to read a data segment. The duration of the common-memory cycle is herein called a common-memory period. While an input port is waiting for its designated write-access interval, it accumulates the data it receives from sub-tending data sources, or from another switch, and arranges the data in a wide data block which is written in the wide memory during the designated access interval of the input port. Likewise, while an output port is waiting to read a data block from the wide memory, it transmits a previous data block received from the common-memory cycle to subtending data sinks or to another switch. A data block may contain packets belonging to several data sinks.

The maximum size of the data block transferred from an input port to the wide memory is determined as the bit-rate-capacity of the input port multiplied by the common-memory period. For example, if the number of input ports is 64 and the number of output ports is also 64, and with a write-access plus read-access interval of each input port of 20 nanosecond, the common-memory period is 64×20=1280 nanoseconds. With each input port having a capacity of 10 Gb/s, the size of a data block would be 12.8 kilobits.

Figure 1:
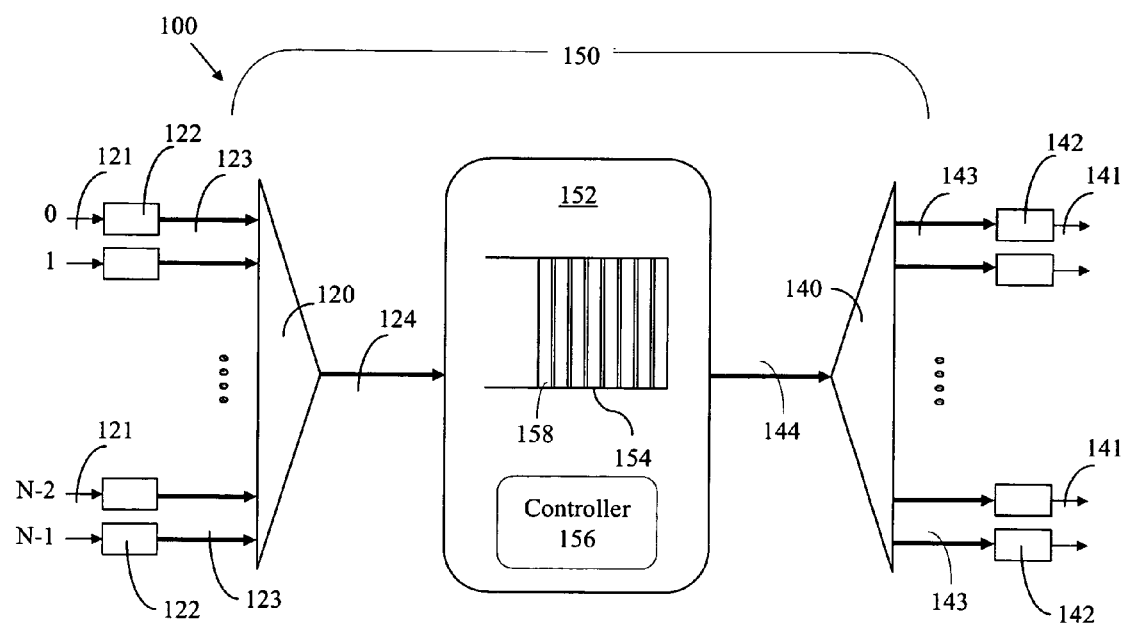
FIG. 1 illustrates a prior-art common-memory switch.

FIG. 1 illustrates a prior-art common-memory switch 100. As described above, a common-memory switch relies on massive data parallelism to enable high-speed data storage and retrieval. A switch fabric 150 comprises a multiplexer 120, a common-memory assembly 152, and a demultiplexer 140. Common-memory assembly 152 includes a common memory 154 and a controller 156. Common memory 154 is shared, in a write-mode, by a plurality of input ports 122 and, in a read mode, by a plurality of output ports 142. Each input port 122 receives data from an incoming channel 121 and transmits data through a channel 123, multiplexer 120, and channel 124 to the common-memory 154. Each output port 142 receives data from common memory 154 through channel 144, demultiplexer 140, and channel 143 and transmits data through an outgoing channel 141. The input ports 122 cyclically access the common memory 154 through multiplexer 120 and the common memory 154 is cyclically connected to the output ports 142 through demultiplexer 140.

Data is stored in common-memory 154 which comprises parallel memory devices that are identically addressed. Data blocks 158 are stored in corresponding addresses in the parallel memory devices constituting the common memory 154. In a common-memory switch 100, there is no internal congestion and each stored data block 158 is guaranteed a path to its desired output port. Flow-rate regulation may then be applied at each output port of the common-memory switch. Data release from the common memory to any output port may be regulated by a flow-rate regulator.

Figure 2:
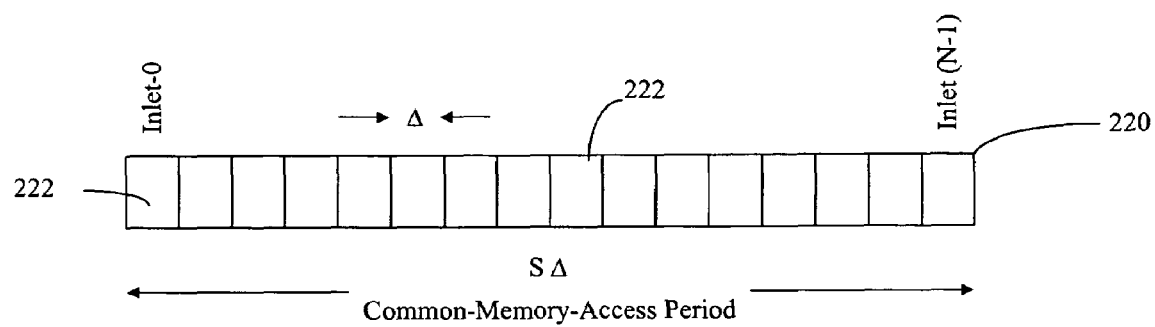
FIG. 2 illustrates data organization into time-slotted frames switched in the common-memory switch of FIG. 1.

FIG. 2 illustrates time organization into time frames 220 each comprising a number S of time slots 222 of $\Delta$ seconds duration each. A data stream having a flow rate of $\rho$ bits per second may be divided into data segments each containing $\rho \times \Delta$ bits, or into data blocks each containing S data segments, hence $\rho \times \Delta \times S$ bits. The data received at an input port of a switching node may be organized in data segments or data blocks each data block having a number of data segments. The received data may also be received in another format then formatted by the input port into data segments or data blocks. A data block must be switched in its entirety to an output port. A data stream organized in data segments may be assigned designated time slots in a time frame at input and switched to designated time slots at output. The number of designated time slots at output may exceed the number of designated time slots at input in the case of multicast switching. Traditionally, a data stream assigned designated time slot in a predefined time frame has been referenced as a time-division-multiplexed (TDM) data stream. A data stream organized in data segments may also be assigned time slots that do not necessarily bear any specific relationship to a time frame or any time reference. A stream of packets, generally of different sizes and arriving at random, may be segmented into data segments of equal size and switched as such within a switching node where, at output, the switched data segments are reassembled into their original packet format. The familiar Asynchronous Transfer Mode (ATM) scheme divides packets of generally variable sizes into data segments called 'cells' which are switched as such within a switching node. In ATM, however, cells are reassembled into packets at the receiving end and not necessarily at the output of the switching node that receives the original packets. ATM cells are not required to follow a strict time reference. An ATM switching node, however, may attempt to reduce the cell delay variation to reduce packet-transfer jitter. When a data stream is organized in a TDM format, but with sizeable segments, the TDM format is referenced as a synchronous transfer mode (STM). Data segments that are aperiodically switched preferably carry identifying headers. In contrast, data segments that are periodically switched need not carry identifiers and may be recognized in each switching node they traverse by the time slots they occupy in a recognizable data frame. A switching node that switches aperiodic data segments, such as an ATM switching node, is by necessity a synchronous switch where data segments are aligned at input. A switching node that switches periodic data segments is of course a synchronous switching node but the data frames, not just the data segments, must be aligned at input. The co-existence of periodic and aperiodic data-segment switching is, therefore, feasible in a synchronous switch, such as the rotator-based switch disclosed in U.S. Pat. Nos. 5,168,492, issued on Dec. 1, 1992 to Beshai et al., and titled "Rotating Access ATM-STM Switch", and U.S. Pat. No. 5,745,486 issued to Beshai et al. on Apr. 28, 1998 and titled "High Capacity ATM switch", the specifications of which are incorporated herein by reference. U.S. Pat. No. 5,168,492 also discloses a method of facilitating hybrid ATM-STM switching where STM switching experiences no delay jitter.

In U.S. Pat. No. 5,168,492, any input port can request periodic switching, aperiodic switching, or interleaved periodic and aperiodic switching of its data segments. Data block switching is also possible in either a periodic or an aperiodic format Switching entire data blocks, each comprising several data segments, is highly desirable for data streams of high flow rate. A data stream of 2 gigabits per second (Gb/s) accumulates 400 bytes in only 1.6 microseconds and the data may therefore be formatted into data blocks of 400 bytes for example. The data block may still be partitioned along segment lines but all segments of the same data block ought to have the same destination. Thus, if transferred in a periodic form, the data segments of a data block would all be identified by a single time slot in a predefined time frame and if transmitted in an aperiodic format, a single header would be used for the entire data block.

Concurrent-access Switch

Hereinafter, a switch in which two or more input ports may concurrently transmit data to the switch fabric and two or more output ports may concurrently receive data through the switch fabric is called a "concurrent-access switch".

Figure 3:
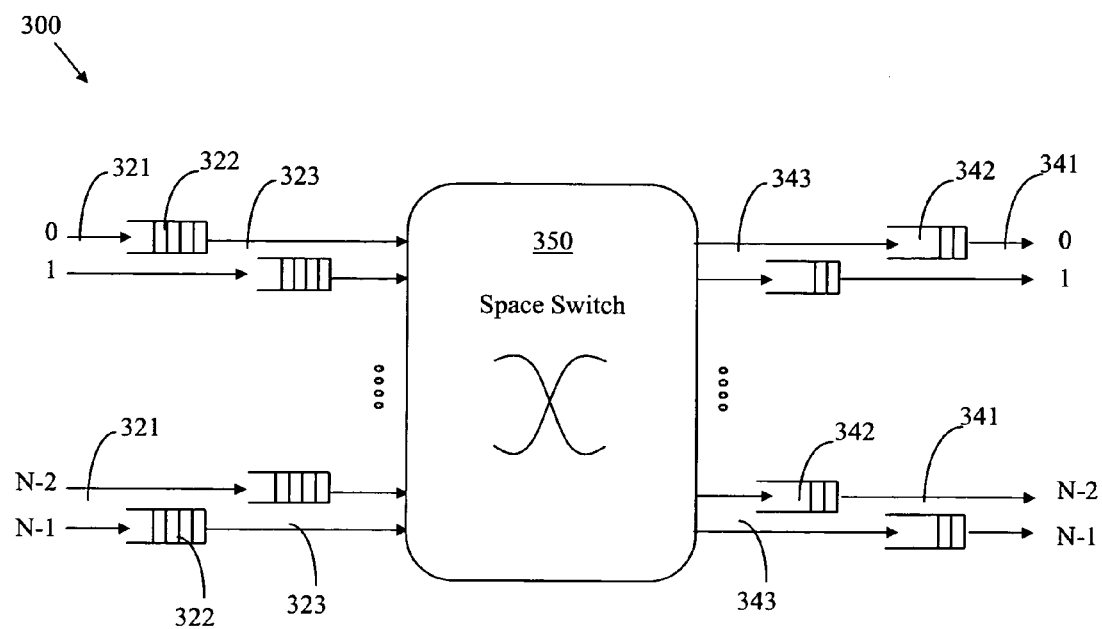
FIG. 3 illustrates a prior-art data switch using a space switch, input buffers, and output buffers.

FIG. 3 illustrates a prior-art concurrent-access data switch 300 known as buffer-space-buffer switch. The switch 300 comprises a switch fabric 350, N input ports each having an input buffer 322, and N output ports each having an output buffer 342. Each input port may receive signals from an incoming channel 321 and has a channel 323 to an inlet of switch fabric 350. Each output port may receive signals from an outlet of switch fabric 350 through a channel 343 and may transmit signals over an outgoing channel 341. It is well known that the switching fabric 350 can scale to accommodate a large number of input ports and output ports. However, the use of the switch 300 in a time-shared mode to provide a fine granularity requires a contention-resolution mechanism, typically implemented as a scheduler, the complexity of which increases rapidly as the number of ports increases.

Figure 4:
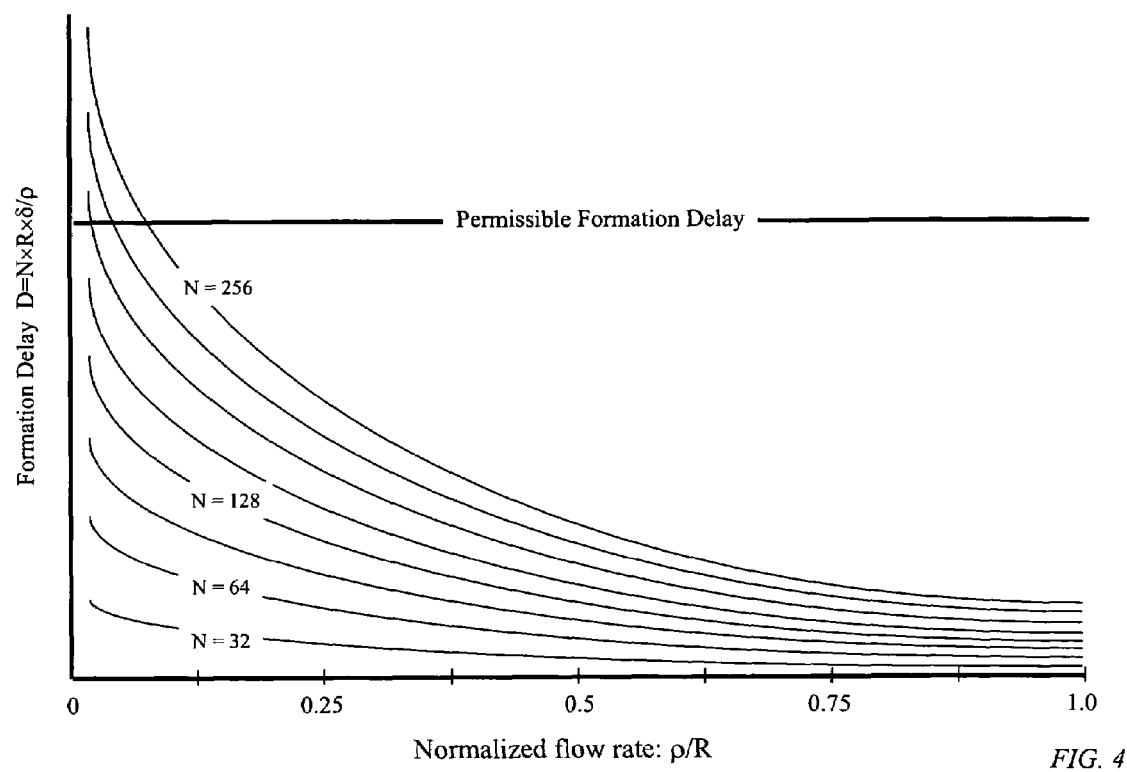
FIG. 4 illustrates delay limitations of a common-memory switch.

FIG. 4 illustrates the dependence of data-block formation delay on the flow-rate of a data stream in the common-memory switch of FIG. 1 (normalized flow rate is used). In a symmetrical common-memory switch having N>1 input ports and N output ports, the data-block formation delay, D, is determine as: $D=N\times\delta\times R/\rho$, where $\delta$ is the common-memory access time (write access plus read access), R is the input-port data rate, and $\rho$ is the flow-rate of the data stream to which the data block belongs. As $\rho$ increases, the data-block formation delay decreases as illustrated in FIG. 4 for different values of N. Naturally, the data-block formation delay increases as N increases. Imposing an upper bound on the formation delay determines a minimum flow rate of a data stream that would be efficiently switched in a common-memory switch. For a specified value of N, the minimum flow rate $\rho^*$ to satisfy a formation delay tolerance D is then $\rho^* = N \times \delta \times R/D$.

Figure 5:
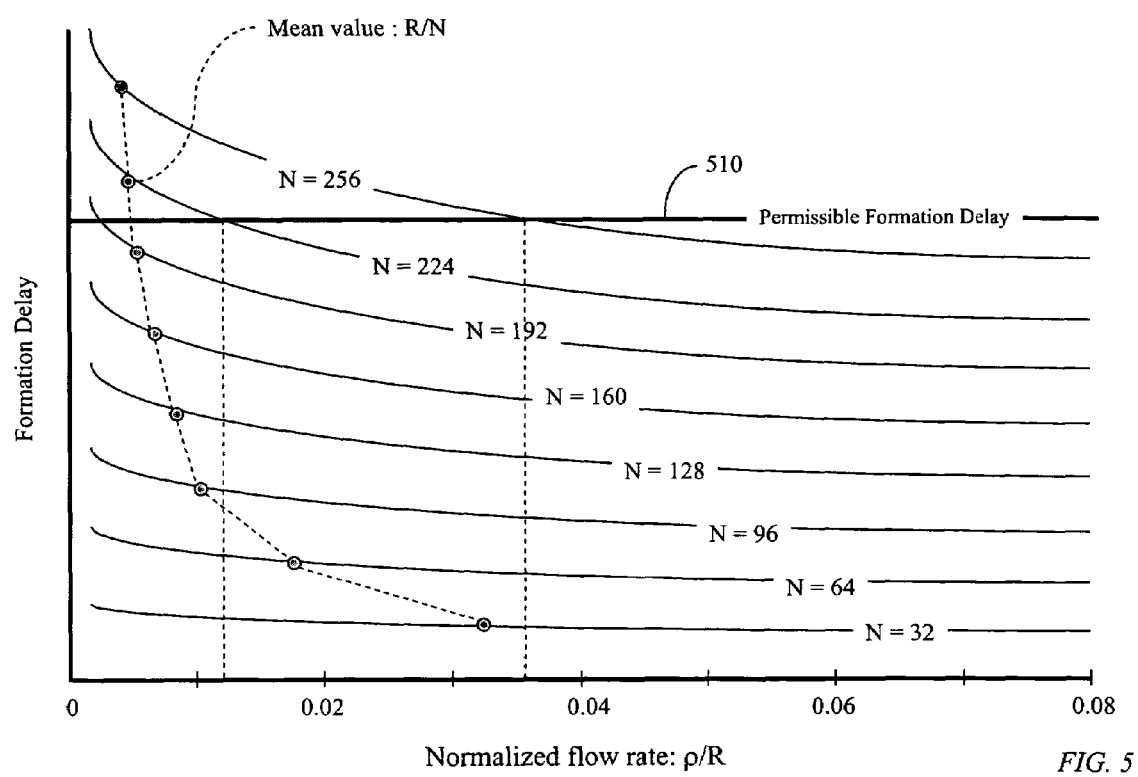
FIG. 5 further illustrates the dependence of data-block formation delay at an input port in a common-memory switch on data flow rate, for use with an embodiment of the present invention.

FIG. 5 is derived from FIG. 4 with the values of the normalized flow rate $\rho/R$ ranging from zero to only 0.08. The figure also indicates the points corresponding to the value of $\rho/R = 1/N$ for a hypothetical reference case where the data rates from an input port to all output ports of a switch are equal, with the input port receiving data at the rated capacity R. For relatively small values of N, the data-block formation delay may be well below a permissible limit 510 even for values of $\rho/R$ smaller than the mean value R/N. For larger values of N, N=256 for example, the data-block formation delay exceeds the permissible delay 510 even for values of $\rho/R$ that are much larger than the mean value R/N.

Figure 6:
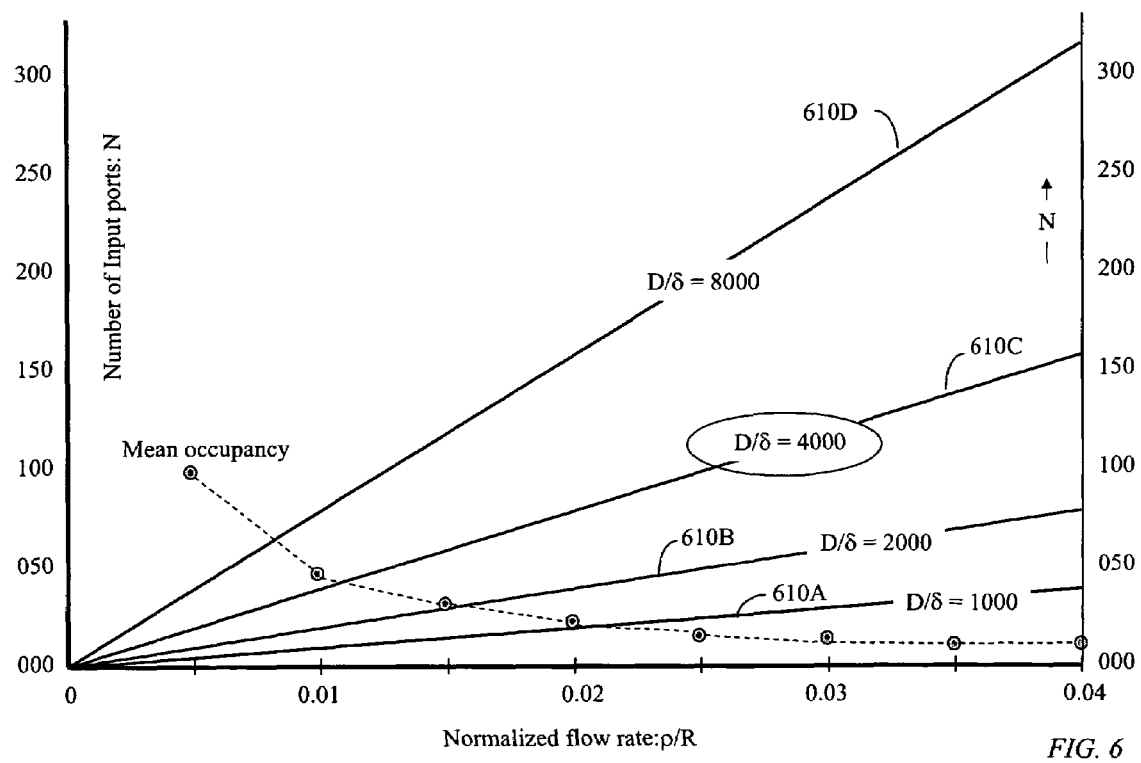
FIG. 6 illustrates the dependence of an upper bound of the number of input ports on data-stream flow rates in a common-memory switch, for use with an embodiment of the present invention.

FIG. 6 illustrates the scalability, in terms of the number of ports of a switch, as a function of the normalized flow rate $\rho/R$ and data-block-formation-delay upper bounds in a common-memory switch. In particular, the figure illustrates a permissible number of input ports in an exclusive-access (common-memory) switch for different flow rates and specified data-block formation delay upper bounds. The permissible number of input ports versus the normalized flow rate $\rho/R$ is illustrated for values of the permissible delay D of 1000$\delta$, 2000$\delta$, 4000$\delta$, and 8000$\delta$ (lines 610A, 610B, 610C, and 610D, respectively), where $\delta$ is the common-memory access time (write plus read). As discussed earlier, in an exclusive-access switch, only one port, input or output, may access a common memory at any instant of time. For example, if the permissible formation delay D equals 4000$\delta$, the permissible number N of input ports would be 160 if the ratio $\rho/R$ is not less than 0.04, but N would be reduced to 80 if the ratio $\rho/R$ is as small as 0.02. This suggests that data streams with flow rates below a selected threshold may advantageously be diverted to a different switch fabric so that the exclusive-access fabric may be used only for data streams of high flow rates. Switching data streams of flow rates each below the selected threshold while observing a formation-delay upper bound would force the formation of incomplete data blocks, each having fewer bits than the common-memory width, thus resulting in capacity waste.

Figure 7:
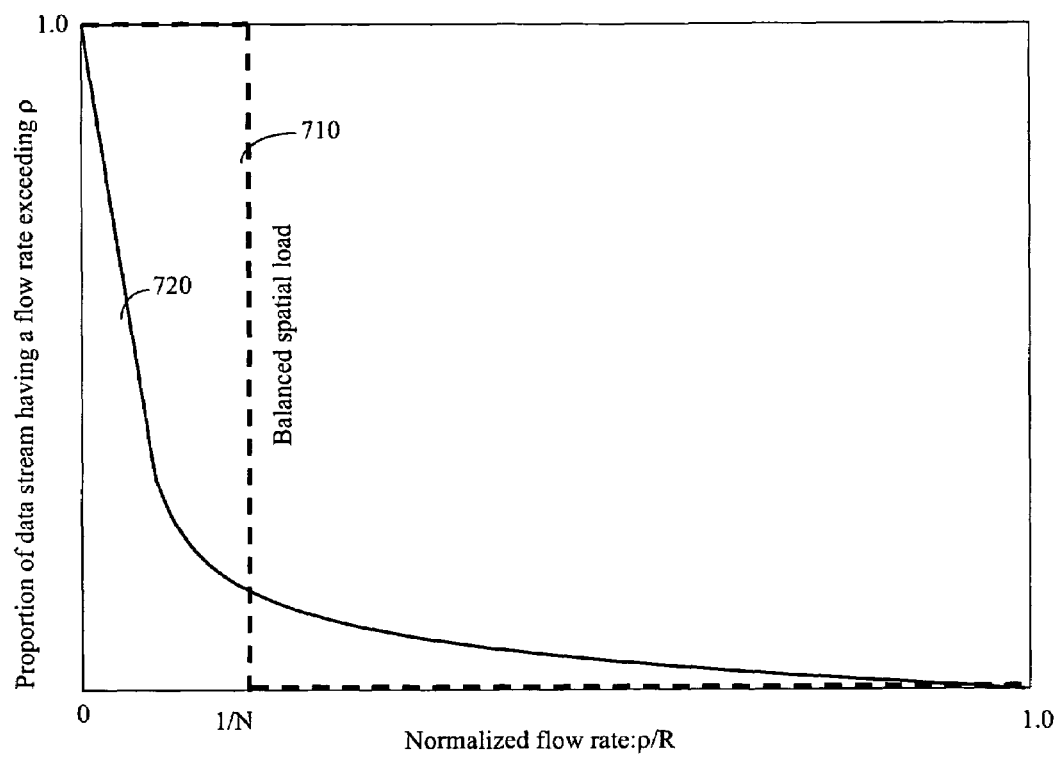
FIG. 7 illustrates an exemplary flow-rate distribution in a data network, for use with an embodiment of the present invention.

FIG. 7 illustrates an exemplary flow-rate distribution in a data network. The figure illustrates the probability of exceeding a normalized flow rate $\rho/R$ of a data stream. The dotted-line 710 represents the case where the combined input data at a given input port is divided equally among the output ports, with the number of output ports being equal to the number, N, of input ports. The normalized flow-rate $\rho/R$ is then equal to 1/N, and the permissible number N is selected so that the data-block formation delay D is below a permissible limit. The maximum value of N is then determined as $N^2 \leq (D/\delta)$ if the number of output ports equals the number of input ports and the read-access time equals the write-access time $\delta/2$. For example, if D=500 microseconds, $\delta$=20 nanoseconds, then N should not exceed 158 (the integer part of the square root of D/$\delta$). The flow rate from an input port to an output port may vary between 0 and R. The solid line 720 represents an exemplary complementary function (i.e., the probability of exceeding a given normalized flow rate) of the spatial distribution of the flow rate among the output ports. In this example, a small proportion of data streams would have high flow rates, each exceeding the mean value of R/N. However, the sum of flow rates of the relatively small number of data stream, each having a flow rate exceeding the mean value R/N, may collectively contribute a high proportion of the total bit rate.

In the prior-art switch buffer-space-buffer switch, illustrated in FIG. 3, data received by each input port is held in an input buffer. When the switch is operated in a time-sharing mode, which is the case considered hereinafter, the data is preferably formatted into data segments of equal size. The input ports may concurrently transfer data across the memoryless space switch to respective output ports. To prevent two or more input ports from simultaneously transferring data to the same output port, a contention-resolution mechanism may be provided at the switch. Each input port may continuously transmit data segments to output ports and each output port may continuously receive data segments from input ports according to a schedule determined by a switch controller. The size of a data segment is arbitrary. However, when an input port has data to transmit to numerous output ports, the data segments are preferably kept reasonably short to reduce delay jitter in transferring the data across the space switch. The size of a typical data segment may be less than two kilobits, for example.

As described above, the scalability of the exclusive-access switch is determined by the delay tolerance. In a uniform switch structure, for example, where the input ports have identical capacities, each input port can access the common-memory during every common-memory period. For a switch having N input ports and N output ports, with an access interval, including write access and read access, of $\delta$ seconds, the common-memory period is determined as N×$\delta$. The size of a data block written during an access interval is then B=N×$\delta$×R, where R is the capacity of the input port in bits per second. For example, if N=128, $\delta$=20 nanoseconds, and R is 10 Gb/s, the data block size B is approximately 25.6 kilobits. The data block formed at an input port may be destined to one output port. If the flow rate from an input port to an output port is $\rho$ bits per second, then the mean value of the time required to form a data block is B/$\rho$ seconds. For example, with $\rho$=8 megabits per second (Mb/s), the ratio B/$\rho$, which is the mean time required to form a data block, is 3.2 milliseconds for B=25.6 kilobits, which may be considered excessive. If $\rho$=1 Gb/s, the formation delay is 25.6 microseconds. In a hypothetical case where the data transmitted from an input port is uniformly divided among the output ports, the mean transfer rate from the input port to any output port is R/N, and the mean data-block formation time is $B/\rho = \delta \times N^2$. With N=256 and $\delta$=20 nanoseconds, the mean data-block formation delay is approximately 1.3 milliseconds. With N=64, the data-block formation delay is approximately 82 microseconds.

The scalability of the concurrent-access switch structure is determined primarily by the speed of the contention-resolution mechanism, i.e., the speed of the switch scheduler. The scheduling effort is directly proportional to the total data flow rate across the space switch.

In summary, comparing the exclusive-access switch architecture and the concurrent-access switch architecture, it is observed that the scalability of the first is governed by the data-block formation delay, which is heavily dependent on the flow rate of each data stream—the higher the rate, the lower the formation delay—while the scalability of the second is determined by the required scheduling effort which is proportional to the total flow rate across the space switch. Notably, a significant advantage of the exclusive-access architecture is its contention-free aspect which implies near zero blocking because blocking may occur only when the entire common memory is fully occupied.

A switch structure, according to the present invention, in which an input port may choose an exclusive-access mode or a concurrent-access mode, provides both scalability and high performance.

Figure 8:
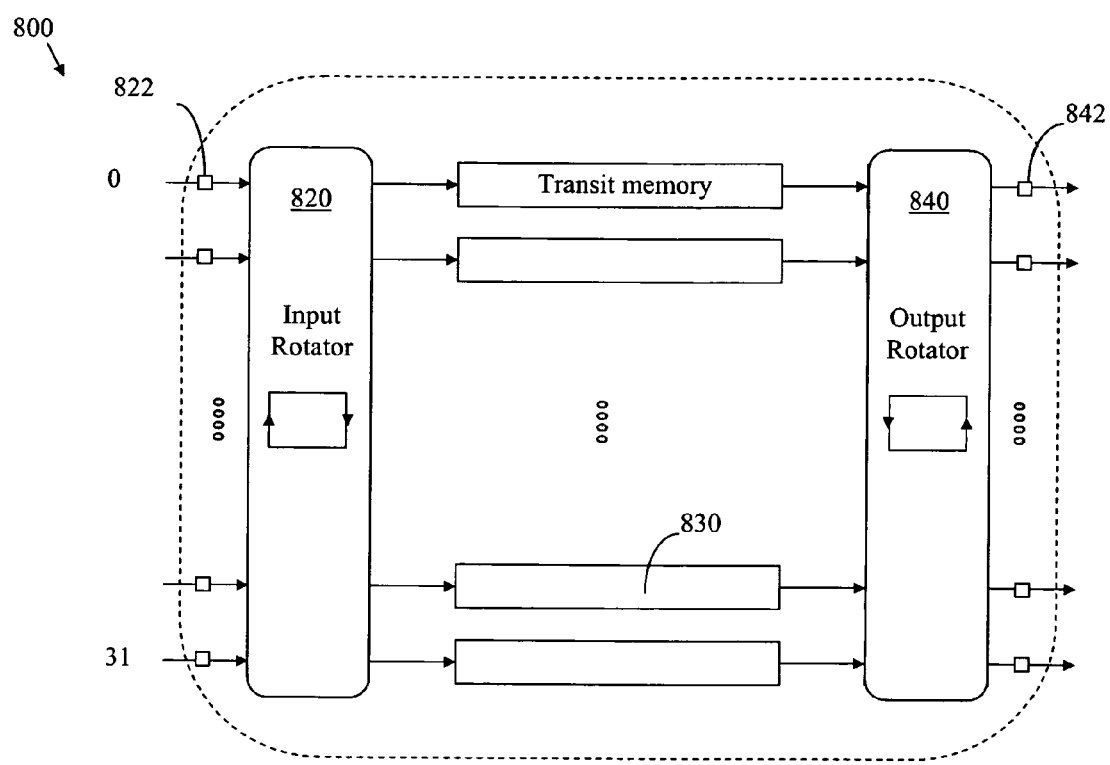
FIG. 8 illustrates a prior art rotator-based switching node including an input rotator, an output rotator, and a bank of transit-memory devices.

FIG. 8 illustrates a rotator-based switch, disclosed in the aforementioned U.S. Pat. No. 5,168,492, having input ports 822 and output ports 842. During a rotator cycle, an input rotator 820 connects each input port 822 to each of a plurality of transit memory devices 830 in a cyclic manner and output rotator 840 connects each of the transit-memory devices 830 to each output port 842 in a cyclic manner. A rotator cycle includes a number of time slots equal to the number, J, of transit-memory devices. During each time slot, an input port may transmit data to the transit-memory device 830 to which it is connected. Likewise, during a time slot, a transit-memory device transmits data to the output port 842 to which it is connected. With N>1 denoting the number of input ports and M>1 the number of output ports, the number J of memory devices is at least equal to the larger of N and M, i.e., J≧N, and J≧M. Each of the transit memory devices 830 is logically partitioned into at least L≧M memory divisions.

The input rotator has N inlets and J outlets, and connects each input port to each transit-memory device 830 during each rotator cycle where a rotator cycle comprises J successive time slots. The output rotator has J inlets and M outlets, and connects each transit-memory device 830 to each output port 842 during each rotator cycle. Each of the N input ports may have an associated input controller (not illustrated) operable to control the transfer of up to J data segments during a rotator cycle to the J transit-memory devices 830.

The combination of input rotator, transit-memory devices, and output rotator effectively function as a scalable space switch and has several advantages over a conventional space switch. The advantages include: (1) structural simplicity, (2) virtually unlimited fabric scalability, and (3) high reliability with ease of recovery from component failure.

Figure 9:
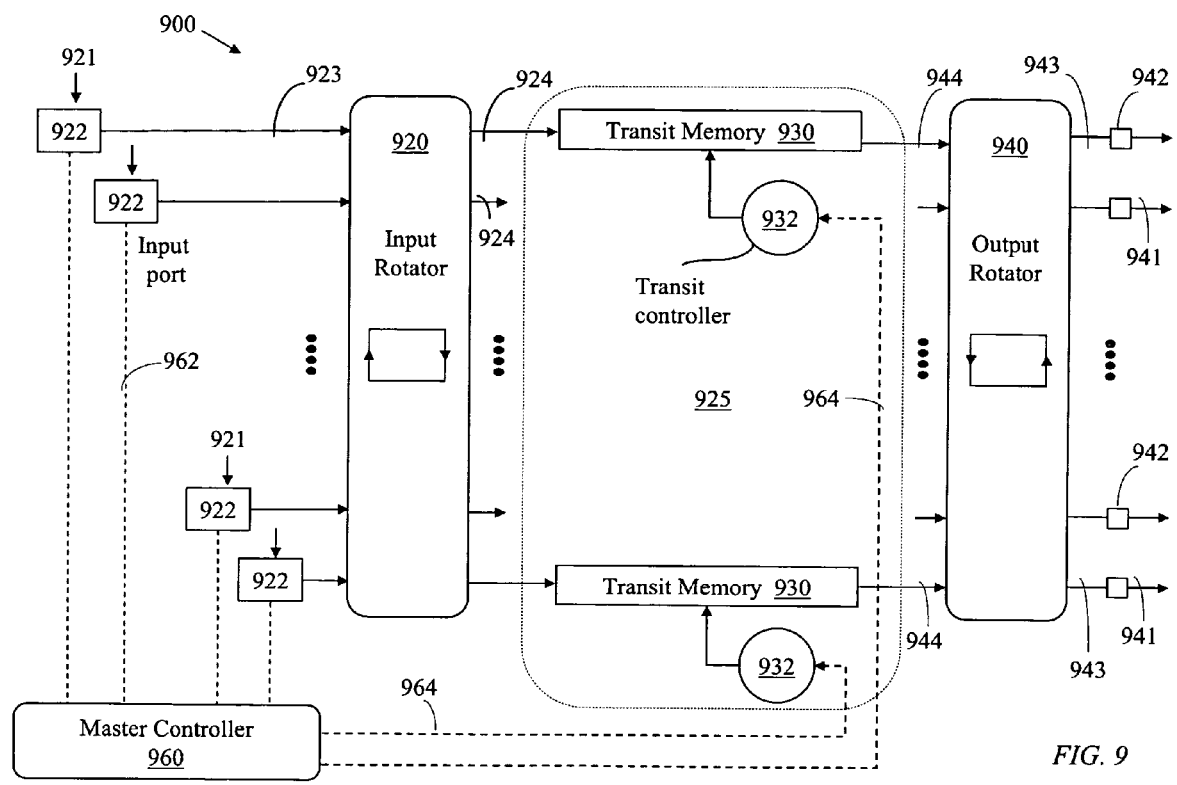
FIG. 9 illustrates a switching node comprising an input rotator, an output rotator, a bank of transit-memory devices, a transit-memory controller associated with each transit memory device, and a master controller in communication with the input ports and the transit-memory controllers, in accordance with an embodiment of the present invention.

FIG. 9 illustrates a switch for handling data streams of disparate flow rates. The switch 900 of FIG. 9 comprises a transit-memory assembly 925, which includes a bank of transit-memory devices 930 interconnecting an input rotator 920 and an output rotator 940. Input rotator 920 has a number of inlets equal to the number of input ports 922 and a number of outlets equal to the number transit-memory devices 930. Output rotator 940 has a number of inlets equal to the number of transit-memory devices and a number of outlets equal to the number of output ports 942. The input rotator 920 and the output rotator 940 have opposite rotation directions. Each transit-memory device 930 has an associated transit-memory controller 932. Input ports 922 receive data from subtending data sources (not illustrated in FIG. 9) through an input channel 921 and arrange the received data in data segments or larger data blocks, where a data block contains a number of data segments not exceeding the number of transit memory devices, as will be described below. Each input port 922 has a channel 923 to an inlet of input rotator 920 and each outlet of input rotator 920 has a channel 924 to a transit memory device 930. Each transit memory device 930 has a channel 944 to an inlet port of output rotator 940 and each outlet port of output rotator 940 has a channel 943 to an output port 942. An output port 942 transmits data read from the transit-memory devices 930 to subtending data sinks or to another switch (not illustrated in FIG. 9) through a channel 941. Input rotator 920 cyclically connects each input port to each transit-memory device and output rotator 940 cyclically connects each transit-memory device to each output port. A master controller 960 is communicatively coupled to each input port 922 through channels 962 and to each transit-memory controller 932 through a channel 964. When a memory division is reserved to hold a data segment, the memory division is marked as occupied and when the data segment is transmitted to an output port, or to multiple output ports in a multicast mode, the memory division is marked as free.

Master controller 960 is operable to determine input-port-specific schedules for data transfer from input ports 922, through input rotator 920, to transit memory devices 930, and transit-memory-specific schedules for data transfer from the transit memory devices 930, through said output rotator 940, to output ports 942.

The input rotator 920 may be configured to periodically repeat an input-configuration cycle having a predefined sequence of input transfer configurations. Likewise, the output rotator 940 may be configured to periodically repeat an output-configuration cycle having a predefined sequence of output transfer configurations. The output transfer configuration is preferably a mirror image of the input transfer configuration so that when an input port associated with a specific output port connects to a transit-memory device 930, during a time slot in a rotator cycle, the same transit-memory device 930 connects to the specific output port during the same time slot.

Exclusive-access Switch

The switch 900 of FIG. 9 can be used as an exclusive-access switch which functions in a manner that is quite similar to that of the wide-memory described with reference to FIG. 1 with the added advantage that input data need not be entirely held at the input port until a wide data block is formed. A rotator-based switch handling data blocks, each traversing an entire set of transit memory devices, is described in Applicant's U.S. patent application Ser. No. 09/671,140 filed on Sep. 28, 2000 and titled "multi-grained network", the specification of which is incorporated herein by reference.

A lateral array is defined hereinafter as an array of transit-memory divisions that includes one memory division from each of the transit-memory devices, and as will be described below, master controller 960 of switch 900 of FIG. 9 may schedule as a separate entity a data segment occupying an individual transit-memory division, or a data block occupying an entire lateral array. Each of the N input ports transfers at most a data segment of $\Omega$ bits during each of the time slots of a rotator cycle, and a lateral array contains data segments originating from a single input port 922 and having at least one common destination (common output port 942). i.e., a data block is transferred in its entirety to one output port or to multiple output ports 942 in a multicast application. When a lateral array is reserved, it is marked as occupied and when the lateral array is released it is marked as free.

The master controller 960 may perform processes of: receiving flow-rate-allocation requests from each of the N input ports 922; allocating a permissible transfer rate in response to each of the requests; communicating the permissible transfer rates to corresponding input ports 922; granting write permits to each of the N input ports, each of the write permits indicating one of the lateral arrays; and granting permits to transit-memory controllers 932 to transfer data segments of lateral arrays from transit memory devices 930 to output ports 942 during each rotator cycle. The master controller may also include a release-rate regulation device operable to select at most one of the lateral arrays for each of the M output ports during each rotator cycle. The common memory switch may include an admission-rate regulation device associated with the master controller; the admission-rate regulation device would be operable to select at most one of the lateral arrays for each of the N input ports during each rotator cycle. The common-memory switch thus constructed may also include an input rate regulation device associated with each of the N input ports to regulate the rate of data transfer from each input port to the transit-memory devices. A data segment may contain information bits and null bits and only the information bits in each data segment are transmitted from each of the N output ports.

The input ports 922 and the output ports 942 are paired. In one embodiment, a paired input port 922 and output port 942 accesses a transit memory 930 during the same time slot. Other disciplines of accessing the transit memory devices 930 may be devised. For example, during a rotator cycle, each input port 922 may access each transit memory device 930 in a write mode during a first part (approximately one half) of the rotator cycle then each output port may access each transit memory device 930 in a read mode during the remaining part of the rotator cycle.

Scalability of the Exclusive-Access Switch

The scalability of the rotator-based exclusive-access switch is determined primarily by a permissible delay D in forming the consecutive data segments of a data block—the delay increases with the number of transit-memory devices. Considering a switch 900 in which the number of input ports 922, the number of transit memory devices 930, and the number of output ports 942 are equal to a specified number N, the N input ports 922 collectively transfer data to the N transit-memory devices at a rate that is less than the ratio $(N \times \Omega)/\delta$ so that:

$$\sum_{j=1}^{N} r_j \geq (N \times \Omega / \delta) \times (1 - (N-1) \times N \times \delta / D),$$

where $\delta$ is the time required to access any of the N transit-memory devices to write and read a data segment, D is a permissible data segment queueing delay, and $r_j$, $1 \leq j \leq N$, is the flow rate at which an input port transfers data to the N transit memory devices.

With identical input ports, each of the N input ports 922 transfers data to the set of transit-memory devices 930 at a rate R limited by:

$R \leq (\Omega/\delta) \times (1-(N-1) \times N \times \delta/D)$

Where, as above, $\delta$ is the time required to access any of the N transit-memory devices to write and read a data segment and D is a permissible data segment queueing delay at any of the N input ports.

Optionally, each input port may be allocated at most a first constrained number of lateral arrays during a predefined time frame of duration T, the first constrained number being specific to each input port, and each output port may be allocated at most a second constrained number of lateral arrays during the predefined time frame of duration T, the second constrained number being specific to the each output port.

Multimodal Switch

Each transit-memory device 930 of switch 900 may be logically partitioned into memory divisions and each memory division has the capacity to hold at least one data segment. The set of transit-memory devices 930 within transit-memory assembly 925 is logically partitioned into a first section organized to hold data blocks and a second section organized to hold data segments. Each data block comprises a number of data segments not exceeding the number of transit-memory devices in the bank of transit-memory devices 930. The logical structure of the transit-memory device 930 will be further described with reference to FIGS. 10-14.

In accordance with the present invention, a rotator-based core is structured to function as a concurrent-access switch and an exclusive-access switch embedded in the same homogeneous structure with arbitrary division of data received from the input ports 922 among the two embedded switches. The structure also facilitates the use of time-division-multiplexing (TDM) switching, as will be described below with reference to FIGS. 15-18, and provides a multicasting capability for data blocks in the exclusive-access mode and data segments in the concurrent-access mode, as will be described below with reference to FIGS. 19-20.

Figure 10:
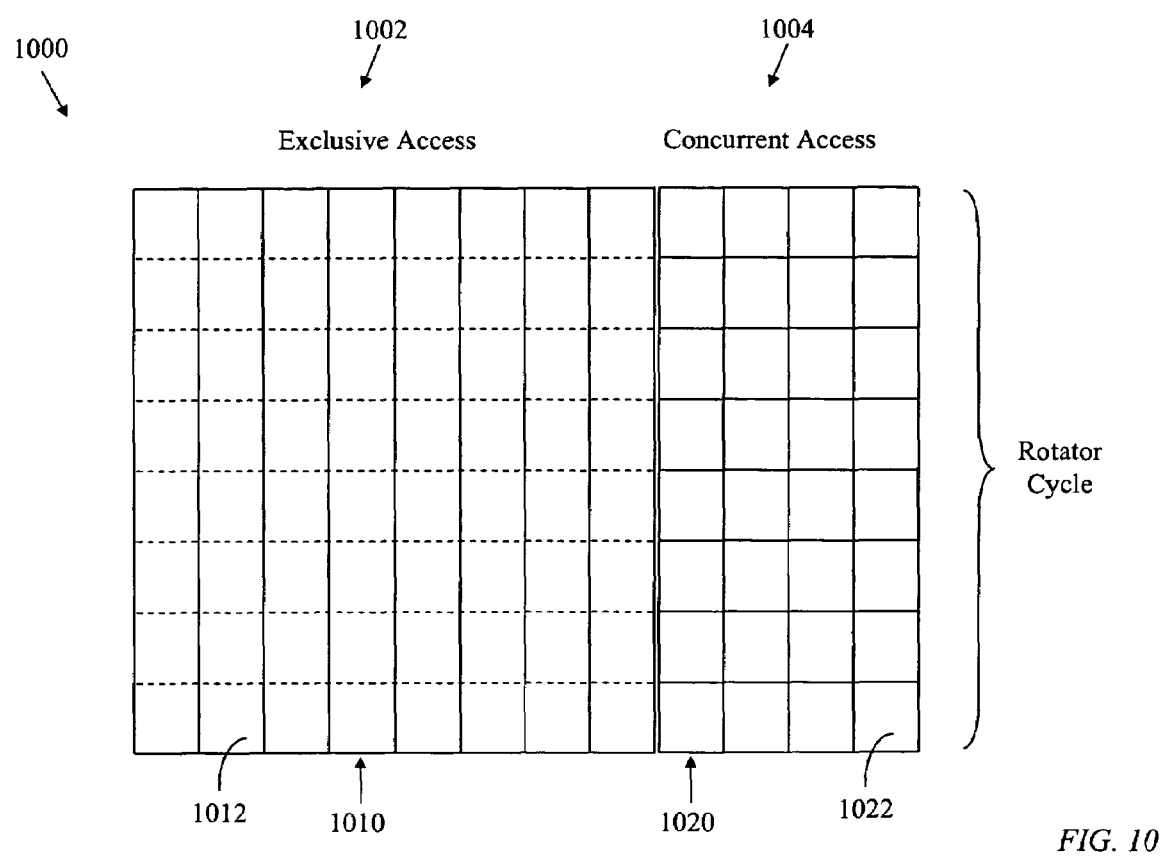
FIG. 10 illustrates the organization of transit memory in the data switch of FIG. 9, where the switch is adapted to perform both concurrent-access and exclusive-access switching, in accordance with an embodiment of the present invention.

FIG. 10 illustrates the organization of transit memory devices 930 in a multimodal data switch 900 adapted to perform both exclusive-access and concurrent-access switching in accordance with an embodiment of the present invention. In this example, the number of input ports 922, the number of transit-memory devices 930, and the number of output ports 942 are equal, and the number, N, of input ports is selected to equal four. The number N is selected to equal four to simplify FIG. 10, but it is understood that a switch 900 may have any integer number N of input ports or output ports. Each transit-memory 930 is divided into two sections. A first section 1002, used to realize an exclusive-access switch, includes an arbitrary number of memory divisions, herein called primary memory divisions, each for holding a data segment of a data block to be transferred from any input port to any output port. A second section 1004, used to realize a concurrent-access switch, includes N memory divisions, herein called secondary memory divisions, each dedicated to a corresponding output port. A specific memory division associated with a specific output port may contain a data segment received from any input port but destined to the specific output port. In general, any memory division in any transit memory device 930 may be associated with a specific output port. However, memory divisions in transit-memory devices 930 used to hold data segments destined to the same output ports are preferably given identical indices in the respective memory devices 930. Thus, a column (array) 1010 in the first section 1002 comprises N primary memory divisions 1012 which may contain data segments written by the same input port and directed to at least one output port 942 while a column 1020 in the second section 1004 may contain N secondary memory divisions 1022 which may contain data segments directed to the same output port but possibly written by different input ports 922. A primary memory division 1012 may be allocated to any input port and any output port and is, therefore, called a 'floating' memory division. The data segments held in primary memory divisions 1012 of a column 1010 form a data block. The second section 1004 of a transit-memory 930 is restricted to hold at most one data segment directed to a specific output port. In contrast, there may be several data blocks stored in the first section 1002 of the transit-memory assembly that are destined to the same output port. Hereinafter, the first section 1002 is referenced as an 'exclusive-access section and the second section 1004 is referenced as a 'concurrent-access section'. A data segment may be transferred to a specific memory division in the concurrent-access section only if the specific memory division is free, i.e., not reserved to hold a data segment, while a data block (comprising an array of data segments) may be transferred to any free address in the exclusive-access section. It is noted that an address of a data block in section 1002 is reserved in each transit-memory device 930.

As described earlier, preferably only the information bits of each data segment are transmitted by an output port, and data transfer from a lateral array to an output port is rate regulated according to the information-bit content of the lateral array. A method and an apparatus for efficiently segmenting variable-size packets, in a plurality of data streams, into segments of equal size is disclosed in Applicant's United States patent application titled "Compact segmentation of variable-size-packets Streams", filed on Dec. 14, 2000, and assigned Ser. No. 09/735,471, the specification of which is incorporated herein by reference. The method concatenates packets of same destination, but possibly belonging to different users, into successive segments in a manner that attempts to minimize segmentation waste while satisfying service-quality requirements of each data stream. The method and apparatus may be used in the multimodal switch 900 of the present invention.

Master controller 960 may receive from input ports 922 flow-rate allocation requests for data streams each defined according to an input port 922 and an output port 942, amongst other attributes. Given the capacity of each output port 942, master controller 960 may then determine a permissible transfer rate corresponding to each flow-rate-allocation request and communicate indications of the permissible rates to respective input ports 922.

In summary, each of the transit-memory devices may be logically partitioned into two groups of memory divisions. The first group includes an appropriate number of memory divisions and the second group includes a number of memory divisions equal to the number of output ports. The appropriate number of memory divisions may be determined according to queueing models well known in the art.

Each memory division in the first group of a particular transit-memory device is associated with a 'peer' memory division in each other transit-memory device to form an array that may be assigned to hold a data block. A data block includes a number of data segments, not exceeding the number of transit-memory devices, which are written by a single input port and destined to at least one output port.

The second group of memory divisions has a one-to-one correspondence to the output ports 942; each memory division in the second group of memory divisions of any transit-memory device 930 corresponds to a specific output port 942 and may hold a data segment written by any input port 922. Thus, the second group of memory divisions has only one memory division per output port and all memory divisions of the second group of different transit-memory devices are independently scheduled.

Selection of Switching Mode

An input port may be adapted to determine a flow rate for each data stream and assign the data stream to the exclusive-access section 1002 if the flow rate exceeds a predetermined threshold or to the concurrent-access section 1004 otherwise. The threshold is governed by a formation-delay tolerance. For a specified value N of a number of input or output ports, and with a formation-delay tolerance τ substantially exceeding the duration of a rotator cycle, the minimum flow rate $\rho^*$ to satisfy the formation delay tolerance τ is then $\rho^* = N \times \delta \times R/\tau$, as described earlier with reference to FIG. 4. R is the input-port maximum flow rate and δ is the access time (write access plus read access) of a transit memory 930.

An input port may also determine an estimate of data volume directed to a specific output port and select the exclusive-access section or the concurrent-access section according to the estimated data volume. The selection of either section may also be influenced by a permissible delay. An input port may determine a delay tolerance for each data stream and assign each data stream to one of the two sections accordingly. Regardless of the selection criterion, an identifier of the selected section (1002 or 1004) is communicated to the master controller 960 for scheduling purposes.

A person skilled in the art will realize that the transit-memory assembly 925 may include the first section 1002, the second section 1004, or both sections. Thus switch 900 may be operated as an exclusive-access switch, a concurrent-access switch, or both.

An input port 922 may receive data of different types, such as periodic data segments, or aperiodic data packets to be divided into data segments of equal size to facilitate internal switching. The input port may classify the received data according to predefined criteria and communicate the classification to the master controller 960 for scheduling purposes.

Transit-Memory Organization

Figure 11:
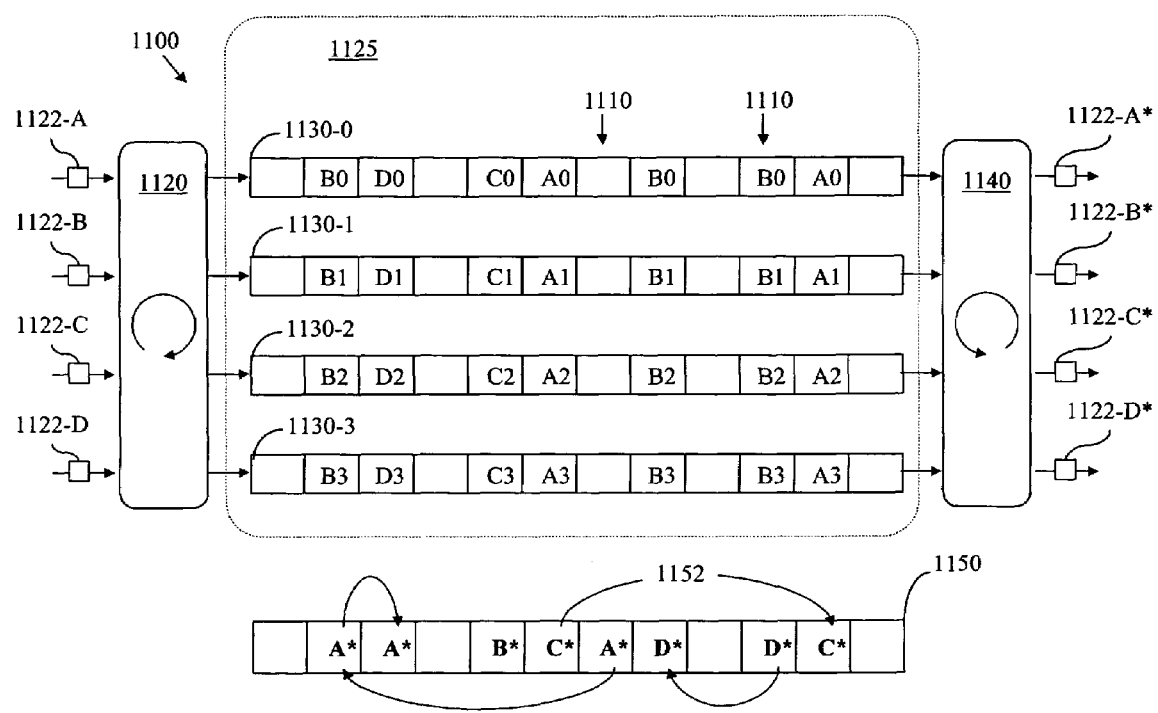
FIG. 11 illustrates the use of the switch of FIG. 9 as an exclusive-access switch for switching data blocks each comprising a number of data segments, with data blocks organized in the transit-memory devices as an interleaved linked list with spatial alignment of the data blocks, in accordance with an embodiment of the present invention.

FIG. 11 illustrates the exclusive-access section of a switch 1100 (similar to switch 900 of FIG. 9) with a transit assembly 1125 comprising transit memory devices 1130 interpose an input rotator 1120 receiving from input ports 1122 and an output rotator 1140 transmitting to output ports 1142. Data blocks may be organized in the transit memory assembly 1125 as an interleaved linked list with spatial alignment of the data blocks. The data segments of the data blocks are spatially aligned, where each input port 1122 starts to write a data block comprising N data segments at a predefined reference transit memory; 1130-0 for example, N being the number of transit-memory devices 1130 in the transit-memory assembly 1125 (in the example of FIG. 11, N is the number of input ports or output ports). Thus, the starting segment of the data block written by any input port appears in the reference transit memory. The reference transit memory is preferably transit memory 1130-0. The memory divisions in the concurrent-access section have a one-to-one correspondence to the output ports and are not illustrated in FIG. 11.

The exemplary switch fabric 1100 has four input ports 1122 labeled A, B, C, and D, four transit-memory devices 1130, and four output ports 1142 labeled A*, B*, C*, and D*. Each of the four transit-memory devices 1130 is organized into twelve memory divisions. Twelve arrays 1110 of memory divisions, each array 1110 having one memory division from each of the four transit-memory devices, serve to hold at most twelve data blocks, each data block having four data segments. An incomplete data block, having less than four data segments, may be complemented by null data. The memory divisions in each array are preferably likewise addressed in their respective transit-memory devices 1130. In the example illustrated in FIG. 11, seven of the twelve arrays 1110 hold data blocks and the remaining five arrays are free (not currently reserved). Two arrays, each labeled {A0, A1, A2, A3}, correspond to data blocks each having four data segments written by input-port A. Three arrays, each labeled {B0, B1, B2, B3} correspond to data blocks each having four data segments written by input port B. One array labeled {C0, C1, C2, C3} has four data segments written by input port C, and one array labeled {D0, D1, D2, D3} has four data segments written by input port D. A master controller (similar to master controller 960 of FIG. 9, not illustrated in FIG. 11) forms four interleaved linked lists 1152 within an array 1150, each linked list corresponding to data blocks destined to one of the output ports A*, B*, C*, and D*. A linked list, in the interleaved linked lists, corresponding to a specific output port may be empty if the bank of transit-memory devices 1130 does not hold any data blocks destined to the specific output port. Data blocks may occupy non-consecutive addresses in the bank of transit memories because the inter-arrival times of data blocks of a data stream may not be equal (as mentioned earlier, a data stream is defined by an input port and an output port, amongst other attributes). Therefore, data blocks are not necessarily released in the same order in which they are received.

Figure 12:
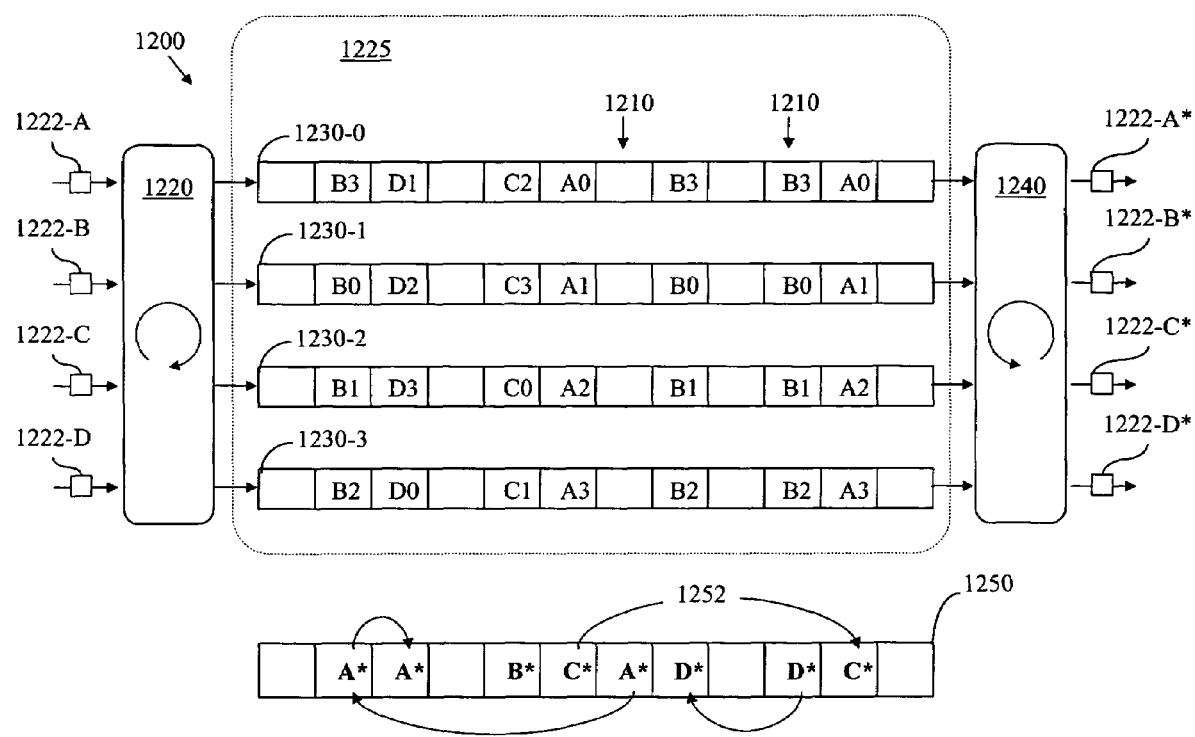
FIG. 12 illustrates the use of the switch of FIG. 9 as an exclusive-access switch for switching data blocks each comprising a number of data segments, with data blocks organized in the transit-memory devices as an interleaved linked list with temporal alignment of the data blocks, in accordance with an embodiment of the present invention.

FIG. 12 illustrates the operation of a switch 1200, similar to switch 900 of FIG. 9, as an exclusive-access switch 1200 with data blocks organized in the memory devices as an interleaved linked list with temporal alignment of the data blocks. A transit assembly 1225 comprising transit memory devices 1230 interpose an input rotator 1220 and an output rotator 1240. Temporal alignment means that a first data segment of a data block is transferred to a transit memory device during a reference time-slot of a rotator cycle. The reference time slot is preferably the first time slot in a rotator cycle. Each input port may start to write a data block comprising N data segments at time-slot 0 of the rotator cycle. Thus, the starting segment of the data block written by a specific input port appears in the transit memory device to which the input port is connected at time-slot 0. In FIG. 12, two data blocks written by input-port 'A' start at transit-memory 1230-0 and one data block written by input port 'D' starts at transit-memory 1230-3.

It is noted that, with temporal data-block alignment, the first-written data segment of a data block is not necessarily the first-read data segment of the data block. Therefore, a data block received at a given output port may be rearranged to place the first-written data segment in the front of a rearranged data block. The rearrangement is deterministic and is determined by relative positions of the input and output ports specified in a connection. With spatial data-block alignment, the first-written data segment of a data block is also the first-read data segment of the data block and no rearrangement is required.

The exemplary switch 1200 has four input ports labeled A, B, C, and D, four transit-memory devices 1230, and four output ports labeled A*, B*, C*, and D*. As in the case of switch 1100, each of the four transit-memory devices 1230 is organized into twelve memory divisions. Twelve lateral arrays of memory divisions, each lateral array having one memory division from each of the transit-memory devices, serve to hold at most twelve data block, each data block having at most four data segments. An incomplete data block, having less than four data segments, may be complemented by null data. The memory divisions in each array are preferably likewise addressed in their respective transit-memory devices. In the example illustrated in FIG. 12, seven of the twelve arrays hold data blocks and the remaining five arrays are free. Two arrays, each labeled {A0, A1, A2, A3}, correspond to data blocks each having four data segments written by input port A. Three arrays, each labeled {B3, B0, B1, B2} correspond to data blocks each having four data segments written by input port B. One array labeled {C2, C3, C4, C0} has four data segments written by input port C, and one array labeled {D1, D2, D3, D0} has four data segments written by input port D. A master controller (not illustrated in FIG. 12, similar to master controller 960 of FIG. 9) forms four interleaved linked lists 1252 within an array 1250, each linked list corresponding to data blocks destined to one of the output ports A*, B*, C*, and D*.

Spatial Versus Temporal Alignment of Data Blocks

Figure 13:
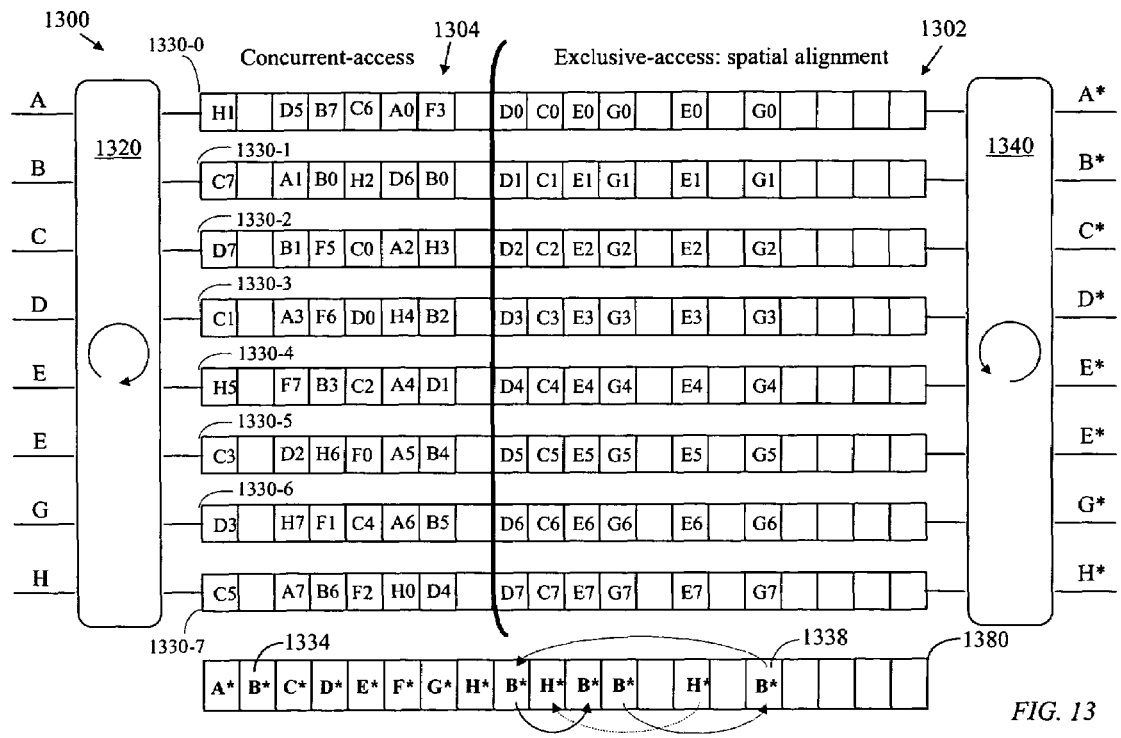
FIG. 13 illustrates data organization in the transit memory devices in a combined exclusive-access and concurrent-access switch with spatial alignment of data blocks, according to an embodiment of the present invention.

FIG. 13 illustrates the data organization in the transit memory devices in a combined exclusive-access and concurrent-access switch 1300 (similar to switch 900 of FIG. 9) having eight transit-memory devices 1330 interposing an input rotator 1320 and an output rotator 1340. Data blocks are spatially aligned where the first data segment of each data block comprising eight data segments is written in the top transit memory device 1330-0. There are twelve arrays of memory divisions in the exclusive-access section 1302 of the transit-memory assembly and eight arrays of memory divisions in the concurrent-access section 1304 of the transit-memory assembly; each array includes one memory division in each of the transit memories. In the exclusive-access section 1302, there is one array {C0, C1, . . . , C7} written by input C and destined to output H*, two arrays {E0, E1, . . . , E7} written by input port E; one destined to output B* and the other to output H*, etc., as indicated by corresponding entries 1338 in array 1380. The interleaved linked list in array 1380 is managed by a master controller (not illustrated in FIG. 13, corresponding to master control 960 of FIG. 9). The concurrent-access section 1304 has data segments destined to outputs A*, C*, D*, E*, F*, and G*, as indicated by entries 1334 in array 1380, but no data segments destined to B* or H* because the scheduler reserved the two output ports B* and H* to temporarily receive data blocks from the exclusive-access section of the transit-memory assembly comprising the eight transit-memory devices 1330. As indicated, the memory divisions of an array in the concurrent-access division corresponding to an output port may contain data segments written by different input ports.

Figure 14:
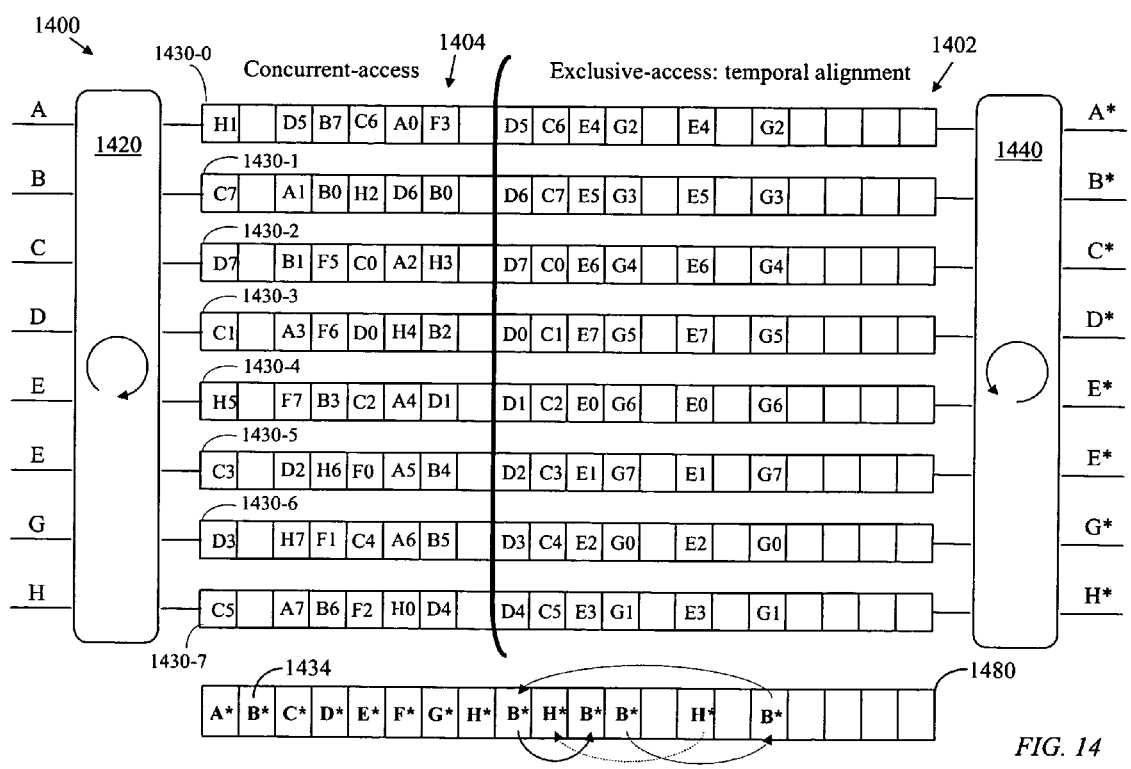
FIG. 14 illustrates the data organization in the transit memory devices in a combined exclusive-access and concurrent-access switch with temporal alignment of data blocks, according to an embodiment of the present invention.

FIG. 14 illustrates the data organization with temporal alignment of data blocks in the transit memory devices 1430 of a combined exclusive-access and concurrent-access switch 1400 (similar to switch 900 of FIG. 9) having eight transit-memory devices 1430 interposing an input rotator 1420 and an output rotator 1440. With temporal alignment, the transit-memory device 1430 holding the first data segment of each data block varies according to the input port that writes the data block. There are twelve arrays of memory divisions in the exclusive-access section 1402 of the transit-memory assembly and eight arrays of memory divisions in the concurrent-access section of the transit-memory assembly; each array includes one memory division in each of the transit memory devices 1430. In the exclusive-access section, there is one array {C0, C1, . . . , C7} written by input C and destined to output H*, as indicated by corresponding entry 1338 in array 1480. The first data segment C0 of the array is written in transit memory 1430-2 and the last data segment C7 is written in transit memory device 1430-1. (In the spatial alignment scheme of FIG. 13, C0 would be written in transit-memory device 1430-0 and C7 would be written in transit-memory device 1430-7). Two arrays {E0, E1, . . . , E7} are written by input port E one destined to output B* and the other to output H* as indicated by corresponding entries in array 1480, and the first data segment of each of the two arrays is written in transit memory device 1430-4. The interleaved linked list in array 1480 is managed by a master controller (not illustrated in FIG. 14—similar to controller 960 of FIG. 9). The concurrent-access section 1404 has data segments destined to outputs A*, C*, D*, E*, F*, and G*, as indicated by entries 1434 of array 1480, and has the same organization of the concurrent section 1304 of FIG. 13.

TDM Switching

Figure 15:
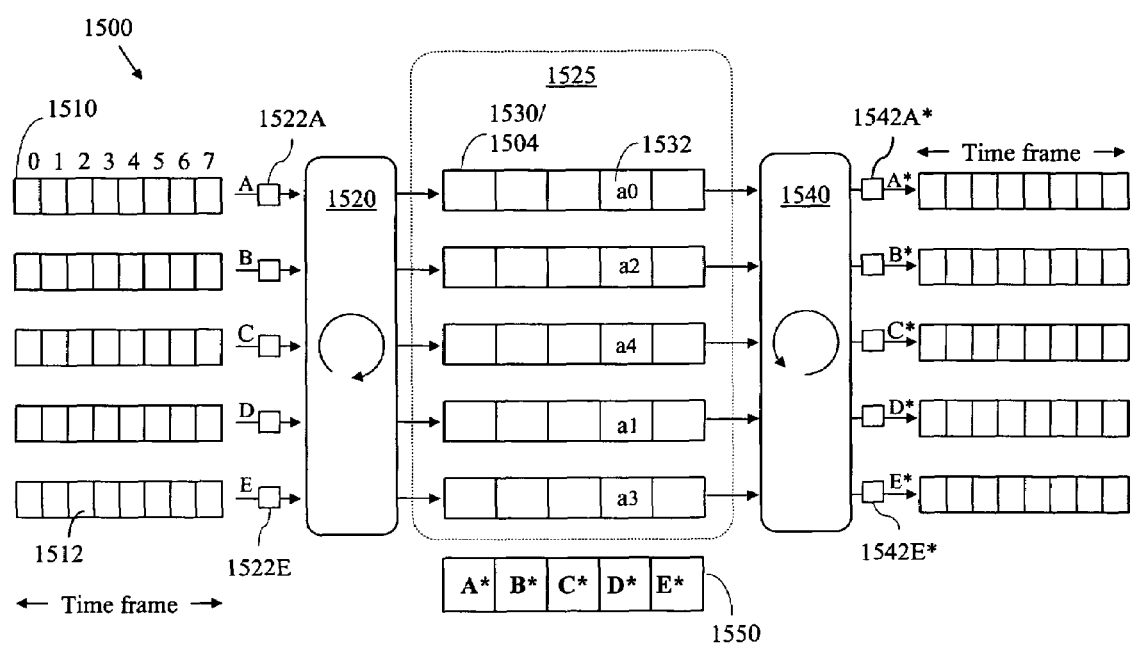
FIG. 15 illustrates the use of the switch of FIG. 9 as a time-division-multiplexing (TDM) switch with an arbitrary number of data segments per time frame, in accordance with an embodiment of the present invention.

FIG. 15 illustrates a switch 1500, similar to switch 900 of FIG. 9 and adapted to function as a TDM switch with an arbitrary number of data segments per TDM time frame. FIG. 15 comprises transit-memory devices 1530 interposing an input rotator 1520 and an output rotator 1540. Each transit-memory device 1530 is organized into an exclusive-access section and a concurrent-access section 1504 as in switch configurations 900, 1100, 1200, 1300, and 1400. Only the concurrent-access section 1504 is illustrated in FIG. 15. The concurrent-access memory divisions of each transit-memory device 1530 may be scheduled for TDM switching or for mixed TDM and packet switching. The exemplary switch 1500 has five input ports 1522A, 1522B, 1522C, 1522D, and 1522E, for brevity referenced as A, B, C, D, and E, respectively, and five output ports 1542A*, 1542B*, 1542C*, 1542D*, and 1542E*, for brevity referenced as A*, B*, C*, D*, and E*, respectively. Input rotator 1520 cyclically connects the input ports 1522 to the transit-memory devices 1530 of transit-memory assembly 1525 and output rotator 1540 cyclically connects the transit-memory devices 1530 to the output ports 1542. Each input port assembles data into a TDM frame having an arbitrary number v of time slots numbered 0 to (v−1). The input ports 1522 transmit data to the output ports 1542 through input rotator 1520, the transit-memory assembly 1525 comprising five transit memory devices 1530, and output rotator 1540. Each concurrent-access section of transit-memory device 1530 is logically divided into five memory divisions 1532 each corresponding to an output port 1542.

In switch 1500, the number of time slots per TDM frame need not be equal to, or bear any rational relationship to, the number of time slots in a rotator cycle which equals the number of transit memory devices 1530. As will be illustrated below, the TDM frame may include an arbitrary number of time slots. If the number of time slots per TDM frame is not equal to the number of time slots per rotator cycle (which, in turn, equals the number of transit-memory devices 1530), data segments occupying likewise-numbered time slots in successive TDM frames may be written in different transit memory devices. For example, with a TDM frame of 8 time slots (v=8), data segments a0, a1, a2, a3, and a4 transmitted by input port 1522A during a first time slot of each of five successive TDM frames are written in transit memory devices 1520-0, 1530-3, 1530-1, 1530-4, and 1530-2, respectively, as indicated in FIG. 15. If the number of time slots per TDM frame exceeds the number of transit-memory devices 1530, an input port may access a given transit memory device 1530, through the input rotator, more than once during a TDM frame. As will be described below, the mapping of an input time slot of a TDM frame onto different transit memory devices does not affect the transit delay, which is the waiting time of a data segment in a transit memory device 1530. FIG. 15 illustrates the case of five input or output ports. Different numbers of input/output ports will be used in FIGS. 14-16 to illustrate the flexibility of TDM switching in switch 1500. A master controller (not illustrated) similar to master controller 960 of FIG. 9 is included in switch 1500.

Figure 16:
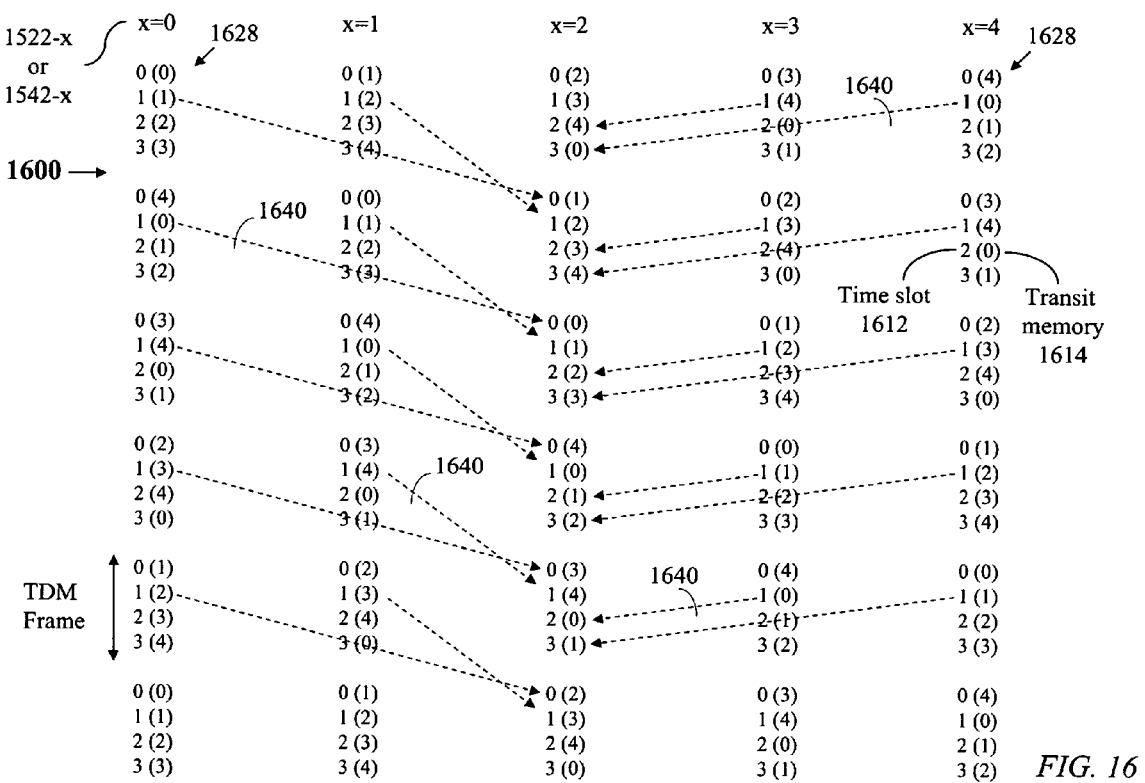
FIG. 16 illustrates the transit-memory access pattern in the switch of FIG. 15 where the number of time slots per TDM frame is smaller than the number of transit-memory devices.

FIG. 16 illustrates the transit-memory access pattern in the switch of FIG. 15 where the number of time slots per TDM frame is smaller than the number of transit-memory devices 1530. Table 1600 illustrates the connectivity pattern during successive TDM frames. The table relates to switch 1500 having a number v of time slots per TDM frame equal to 4. The header in Table 1600 refers to input ports 1522-x and output ports 1542-x, x=0, 1, 2, 3, and 4. During each time slot, an input port 1522-x accesses a transit-memory device 1530-y in a write-mode and an output port 1542-x, associated with input port 1522-x, accesses the same transit-memory device 1530-y in a read mode. Other access disciplines may be devised. Each column (array) 1628 corresponds to an input port 1522-x or an output port 1542-x and each entry in the column contains a time-slot identifier 1612 (0 to 3) and a transit-memory identifier 1614 (between parentheses and labeled as 0 to 4 in this example) to which input port 1522-x and output port 1542-x connect during each of successive time slots. In the example of FIG. 16, input port 1522-0 and output port 1542-0 access transit-memory devices 1530-0, 1530-1, 1530-2, and 1530-3 during a first TDM frame, then access transit-memory devices 15304, 1530-0, 1530-1, and 1530-3 during the subsequent TDM frame. Likewise, input port 1522-2 connects to transit-memory devices 1530-2, 1530-3, 1530-4, and 15340-0 during the first TDM frame and connects to transit-memory devices 1530-1, 1530-2, 1530-3, and 1530-4 during the subsequent TDM frame.

It is observed from FIG. 16 that the connectivity pattern shifts during successive TDM frames. Because the number of time slots per TDM frame is not equal to the number of transit-memory devices, the connectivity pattern varies in successive TDM frames. However, the connectivity pattern repeats every Q time slots, where Q is an integer multiple of both the number of transit-memory devices and the number of time slots per TDM frame. In the example of FIG. 16, Q=20 time slots.

In the example of FIG. 16, each of input ports 1522-0, 1522-1, 1522-3, and 1522-4 has one time-slot per TDM frame allocated for transmission to output port 1542-2. The time slots of a TDM frame are indexed as 0, 1, 2, and 3. One of many connectivity patterns is indicated below. Coincidentally, each of the four input ports 1522 transmitting to output port 1542-2 has reserved time slot 1 of the TDM frame. Of course, different input time slots may have been used. For example, the four input ports 1522-0, 1522-1, 1522-3, and 1522-4 could have reserved time slots 2, 0, 0, and 2 respectively. The scheduling of time slots may be performed by the master controller of switch 1500 or through communications between the input ports 1522 and controllers (not illustrated—similar to controllers 932 of FIG. 9) of the transit-memory devices 1530.

Input port 1522-0 (column x=0) reserves time-slot 1 of each TDM frame to write data segments directed to output port 1542-2 during successive TDM frames. The data segments are written in transit-memory devices 1530-1, 1530-0, 1530-4, 1530-3, 1530-2, 1530-1, and so on.

Input port 1522-1 (column x=1) reserves time-slot 1 of each TDM frame to write data segments directed to output port 1542-2. The data segments are written in transit-memory devices 1530-2, 1530-1, 1530-0, 1530-4, 1530-3, 1530-2, and so on, as illustrated by parallel arrows 1640-1.

Input port 1522-3 (column x=3) reserves time-slot 1 of each TDM frame to write data segments directed to output port 1542-2. The data segments are written in transit-memory devices 1530-4, 1530-3, 1530-2, 1530-1, 1530-0, 1530-4, and so on, as illustrated by parallel arrows 1640-3.

Input port 1522-4 (column x=4) reserves time-slot 1 of each TDM frame to write data segments directed to output port 1542-2. The data segments are written in transit-memory devices 1530-0, 1530-4, 1530-3, 1530-2, 1530-1, 1530-0, and so on, as illustrated by parallel arrows 1640-4.

Figure 17:
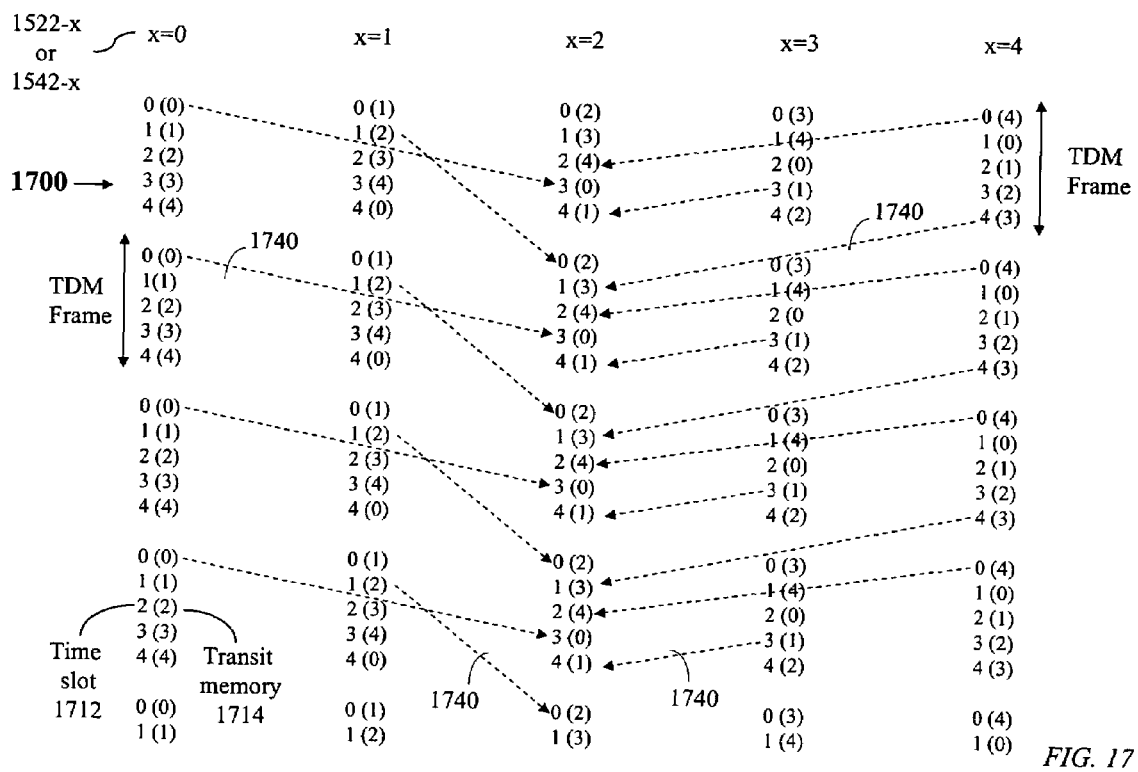
FIG. 17 illustrates the transit-memory access pattern in the switch of FIG. 15 where the number of time slots per TDM frame is equal to the number of transit-memory devices.

FIG. 17 illustrates the transit-memory access pattern in the switch of FIG. 15 where the number v of time slots per TDM frame is equal to the number J of transit-memory devices 1530 (v=J=5). In the example of FIG. 17, each of input ports 1522-0, 1522-1, and 1522-3 has one time-slot per TDM frame allocated for transmission to output port 1542-2 and input port 1522-4 has two time slots per TDM frame allocated for transmission to output port 1522-2. One of many connectivity patterns is indicated in Table 1700. The header in Table 1700 refers to input ports 1522-x and output ports 1542-x, x=0, 1, 2, 3, and 4.

Input port 1522-0 (column x=0) reserves time-slot 0 of each TDM frame to write data segments directed to output port 1542-2, and the data segments are written in the same transit-memory device 1530-0 during successive TDM frames.

Input port 1522-1 (column x=1) reserves time-slot 1 of each TDM frame to write data segments directed to output port 1542-2 and the data segments are written in the same transit-memory device 1530-2 during successive TDM frames.

Input port 1522-3 (column x=3) reserves time-slot 3 of each TDM frame to write data segments directed to output port 1542-2, and the data segments are written in the same transit-memory device 1530-1 during successive TDM frames.

Input port 1522-4 (column x=4) reserves time-slots 0 and 4 of each TDM frame to write data segments directed to output port 1542-2, and the data segments are written in the same transit-memory devices 1530-4 and 1530-1 during successive TDM frames.

Thus, during each TDM frame, output port 1542-2 receives, through the transit-memory assembly, one data segment from each of input ports 1522-0, 1522-1, and 1522-3, and two data segments from input port 15224. In this example, the connectivity patterns are identical in successive TDM frames because the number v of time slots per TDM frame equals the number J of transit-memory devices 1530. As illustrated, during each time-slot 0 of a TDM frame, output port 1542-2 reads a data segment from transit-memory 2 written by input port 1522-1. During time-slots 1, 2, 3, and 4, output port 1542-2 reads data segments from transit memories 3, 4, 0, and 1, written by input ports 1522-4, 15224, 1522-0 and 1522-3, respectively, as indicated by lines 1740.

Figure 18:
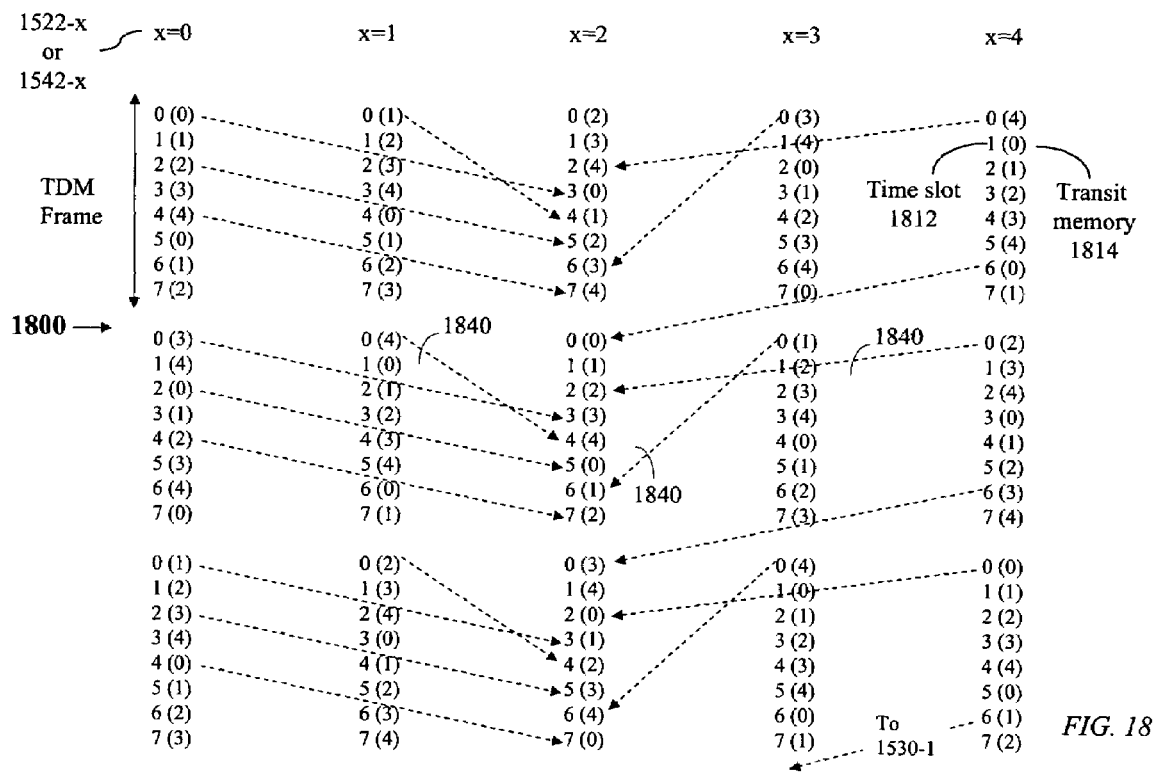
FIG. 18 illustrates the transit-memory access pattern in the switch of FIG. 15 where the number of time slots per TDM frame is larger than the number of transit-memory devices.

FIG. 18 illustrates the transit-memory access pattern in the switch of FIG. 15 where the number v of time slots per TDM frame is larger than the number J of transit-memory devices 1530. In this example, there are five transit-memory devices (1330-0 to 1530-4) and the TDM frame contains eight time slots (v=8, J=5). In the example of FIG. 18, seven time slots per TDM frame are scheduled. The numbers of time slots per TDM frame allocated to input ports 1522-0, 1522-1, 1522-3, and 1522-4 for transmission to output port 1542-2 are 3, 1, 1, and 2, respectively. One of many connectivity patterns is indicated in Table 1800. The header in Table 1800 refers to input ports 1522-x and output ports 1542-x, x=0, 1, 2, 3, and 4.

Input port 1522-0 (column x=0) reserves time-slots 0, 2, and 4 of each TDM frame to write data segments directed to output port 1542-2. During a first TDM frame, the data segments are written in transit-memory devices 1530-0, 1530-2, and 1530-4. During the second TDM frame, the data segments are written in transit memory devices 1530-3, 1530-0, and 1530-2 and during the third TDM frame, the data segments are written in transit memory devices 1530-1, 1530-3, 1530-0, and so on.

Input port 1522-1 (column x=1) reserves time-slot 0 of each TDM frame to write data segments of a stream directed to output port 1542-2. The data segments of the stream are written in transit-memory devices 1530-1, 1530-4, 1530-2, 1530-0, 1530-3, 1530-1, and so on.

Input port 1522-3 (column x=3) reserves time-slot 0 of each TDM frame to write data segments of a stream directed to output port 1542-2. The data segments of the stream are written in transit-memory devices 1530-3, 1530-1, 1530-4, 1530-2, 1530-0, 1530-3, and so on.

Input port 1522-4 (column x=4) reserves time-slots 0 and 6 of each TDM frame to write data segments directed to output port 1542-2. During the first TDM frame, the data segments are written in transit-memory devices 1530-4 and 1530-0. During the second TDM frame, the data segments are written in transit memory devices 1530-2 and 1530-3 and during the third TDM frame, the data segments are written in transit memory devices 1530-0 and 1530-1.

Thus, during each TDM frame, output port 1542-2 receives, through the transit-memory assembly 1525, three data segment from input port 1522-0, one data segment from input port 1522-1, two data segments from input port 1522-3, and two data segments from input port 1522-3. The connectivity pattern varies in successive TDM frames but, as described with reference to FIG. 16, the connectivity pattern repeats in successive periods of Q time slots each, where Q is an integer multiple of both the number of transit-memory devices and the number of time slots per TDM frame. In this example, Q=40 time slots.

As illustrated, during the second TDM frame, output port 1542-2 reads a data segment from transit-memory 0 written by input port 1522-4. During time-slots 2 to 7, output port 1542-2 reads data segments from transit memory devices 1530-2, 1530-3, 1530-4, 1530-0, 1530-1, and 1530-2, written by input ports 1522-4, 1522-0 and 1522-1, 1522-0, 1522-3, and 1522-0 respectively, as indicated by lines 1840.

It is noted that the transit delay of a data segment written by an input port 1522-x to be read by an output port 1542-y, $0 \leq x < N$, $0 \leq y < N$, is determined as $[N+x-y]$ modulo N and is independent of the number v of time slots per TDM frame, as observed in FIGS. 16, 17, and 18.

Multi-Casting

Figure 19:
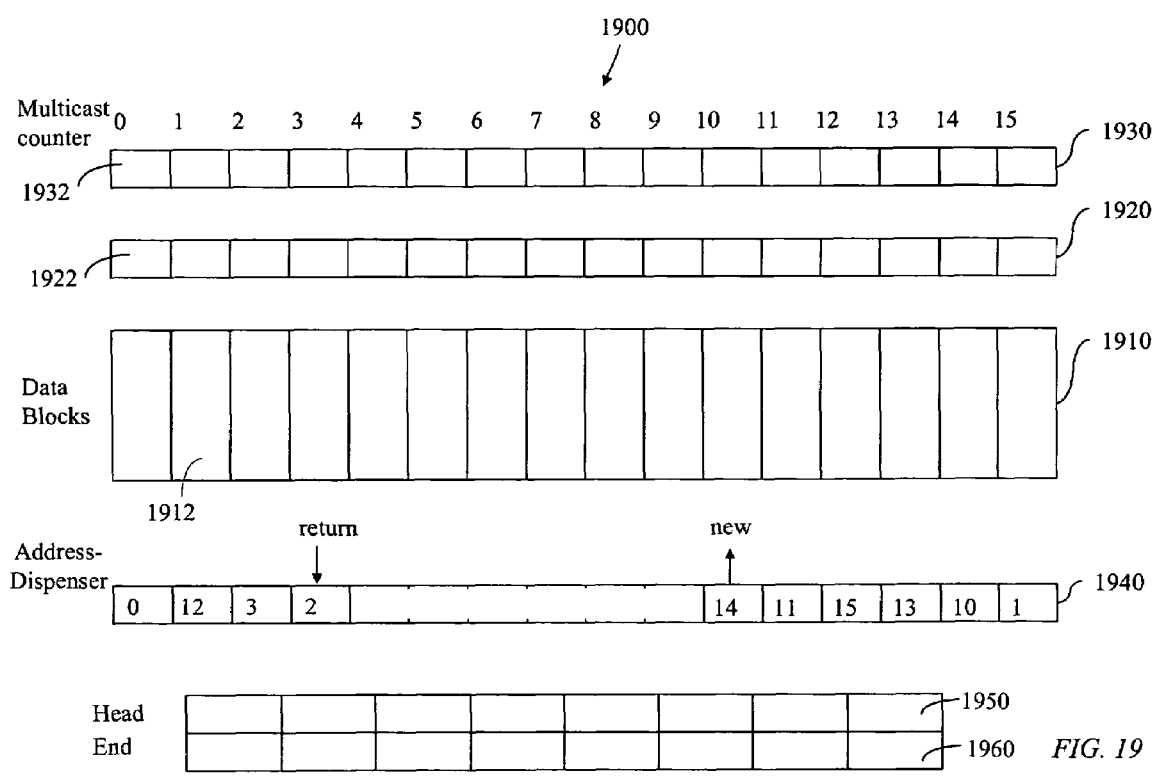
FIG. 19 illustrates data structures used by a controller for exclusive-access multicasting in a multimodal data switch, in accordance with an embodiment of the present invention.

FIG. 19 illustrates data structures 1900 used to facilitate exclusive-access multicasting in the multimodal data switch of FIG. 9. Data blocks are held in a data memory 1910, which represents the exclusive-access section 1002 (FIG. 10) of the set of transit-memory devices 930 of transit-memory assembly 925 of switch 900. A memory block 1912 in the data memory 1910 corresponds to an array (column) 1010 (FIG. 10) in transit-memory assembly 925 (FIG. 9). The data structure used to manage the storage and removal of data blocks from memory blocks 1912 in the data memory 1910 comprises: an array 1920 containing pointers 1922 to successive data blocks in data memory 1910 belonging to the same data stream; an array 1930 containing an indicator 1932 of the number of destinations (output ports) of each data block 1912 in data memory 1910; a memory-address dispenser array 1940 containing a list of free addresses in data memory 1910; an array 1950 of pointers to the data-memory address of the head data unit of each data stream; and an array 1960 of pointers to the address of the end data unit of each data stream. Each array in the data structure 1900 may be updated with each addition or removal of a data block. The number of entries in each of data memories 1910, 1920, 1930, and 1940 equals the number of arrays (columns) 1010 (FIG. 10) in transit-memory assembly 925. The number of entries in each of arrays 1950 and 1960 equals the permissible maximum number of data streams. Each entry in memory-address-dispenser array 1940 includes an address of a free (i.e., unassigned) array 1010 (FIG. 10) in the transit-memory assembly 925 (FIG. 9). Array 1940 is initialized by the addresses of each array 1010 in the transit-memory assembly 925. The initial addresses may be placed in array 1940 in an arbitrary order; for example a sequential order. With identical transit-memory devices 930 (FIG. 9), an address of an array 1010 is the address of any of its constituent primary memory divisions 1012 (FIG. 10).

Figure 20:
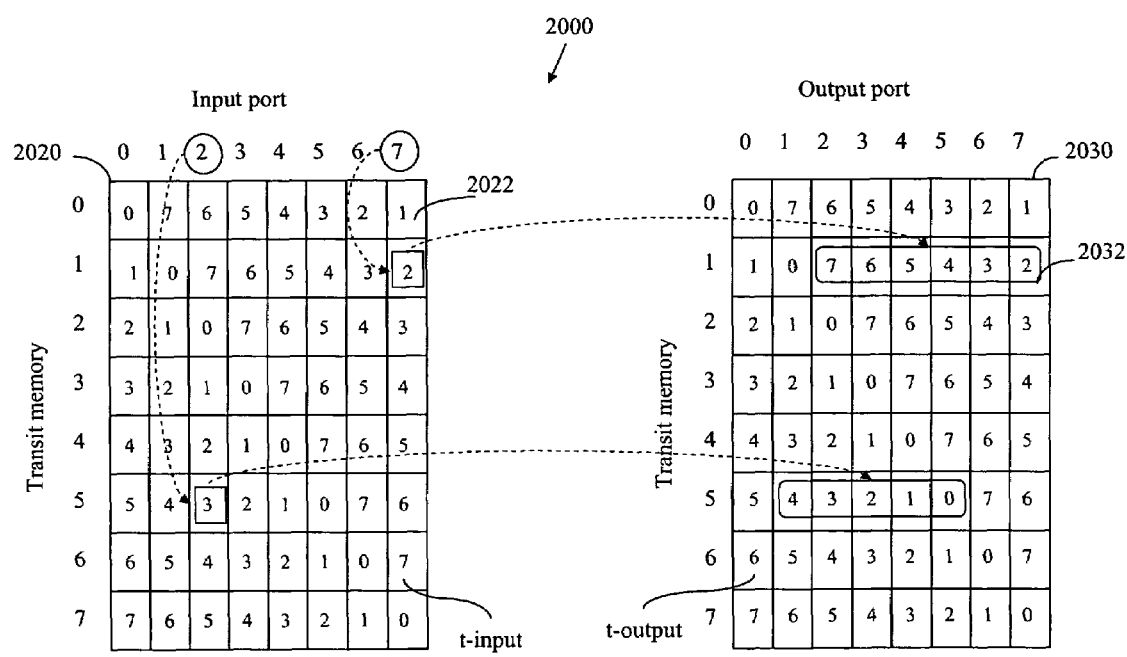
FIG. 20 illustrates concurrent-access multicasting in a multimodal data switch, in accordance with an embodiment of the present invention.

FIG. 20 illustrates a data structure 2000 used by master controller 960 to facilitate concurrent-access multicasting in a multimodal data switch 900 (FIG. 9) for the special case where the number of time slots per time frame equals the number of transit-memory devices 930. The number of output ports equals the number N of input ports in this example. A first matrix 2020 has N columns, each corresponding to an input port, and N rows, each corresponding to a transit-memory device 930. A second matrix 2030 also has N columns each corresponding to an output port and N rows, each corresponding to a transit-memory device. Each entry 2022 in matrix 2020 contains a corresponding occupancy state (free/busy represented by a single bit for example—not illustrated in FIG. 20) and each entry 2032 in matrix 2030 contains a corresponding occupancy state 2031. For illustration only, a cyclic time slot 2022 of a rotator cycle at which an input port connects to a transit memory is indicated in matrix 2020 and a cyclic time slot 2032 at which a transit memory connects to an output port is indicated in matrix 2030. The cyclic time slots 2022 and 2032 may be used to determine transit delays but may not be needed for scheduling purposes.

To schedule the transfer of a data segment from a specific input port to a list of q target output ports, $1 \leq q < N$, a row in matrix 2030, corresponding to a candidate transit-memory, is selected and the entries corresponding to the output ports in the list of q target output ports are examined. If the entry corresponding to the specific input port and the candidate transit memory is busy, another candidate transit memory may be selected. Otherwise, the occupancy states corresponding to the candidate transit memory and output ports included in the list of q target output ports are examined to identify target output ports that can be connected through the candidate transit memory and the number of available connections is recorded. The process may be repeated using other candidate transit memories and the transit memory yielding the highest connections is selected. If the number of highest connections is lower than the specified number q, the remaining connections may be established through another transit memory. With partial success, i.e., if less than q connections can be established, a multicast connection request may be accepted or rejected depending on the admission policy. Naturally, only the selected entries in matrix 2020 and matrix 2030 are marked busy and when a connection is terminated the corresponding entries in matrices 2020 and 2030 are marked free.

In general, to schedule the transfer of data segments from input ports to output ports through a number of data memories, where the data memories have cyclic access to the input ports and output ports during successive time slots of a time-slotted frame, an association of each input port with the data memories during successive time slots, i.e., a time-space map, is first determined. A first matrix having a number of rows equal to the number of data memories and a number of columns equal to the number of input ports is then created. Each entry in the first matrix indicates a corresponding input-port occupancy state. A second matrix having a number of rows equal to the number of data memories and a number of columns equal to the number of output ports is also created. Each entry in the second matrix indicates a corresponding output-port occupancy state.

Upon receiving a request to transfer a specified number of data segments from a specified input port to a specified output port within the time-slotted frame, a vacancy-matching process is carried out which includes steps of selecting a candidate data memory, reading a first occupancy state from an entry in the first matrix corresponding to the candidate data memory and the specified input port, and, if the first occupancy state is favorable (indicating availability), reading a second occupancy state from an entry in the second matrix corresponding to the candidate data memory and the specified output port. If the second occupancy state is favorable, the number of allocable time slots (initialized as zero) is increased by one. The process is repeated until a sufficient number of time slots is allocated or all data memories have been considered.

Thus, the invention provides a multi-modal switch that is flexibly partitioned into an exclusive-access common-memory-like section and a concurrent-access space-switch-like section and which enables efficient switching of data stream of disparate flow rates.

In view of the description above, it will be understood by those of ordinary skill in the art that modifications and variations of the described and illustrated embodiments may be made within the scope of the inventive concepts. Moreover, while the invention is described in connection with various illustrative structures, those of ordinary skill in the art will recognize that the invention may be employed with other structures. Accordingly, the invention should not be viewed as limited except by the scope and spirit of the appended claims.

I claim:

1. A switch comprising:
a plurality of input ports;
a plurality of output ports;
a plurality of transit-memory devices each cyclically connecting to each of said input ports and output ports during a predefined time-slotted frame, and each logically partitioned into:
a first group of primary memory divisions each for holding a data segment from any of said input ports destined to any of said output ports; and
a second group of secondary memory divisions having a one-to-one correspondence to said output ports;
a plurality of transit-memory controllers each transit-memory controller associated with a respective one of said transit-memory devices; and
a master controller communicatively coupled to each of said input ports and each of said transit-memory controllers;
wherein said master controller is operable to:
receive, from said input ports, scheduling requests each scheduling request associated with a specific data segment from a specific input port and including an identifier of a specific data stream to which said specific data segment belongs;
determine a preferred group, from said first group and said second group, to receive said specific data segment;
determine a transfer time of said specific data segment from said specific input port to said preferred group;
communicate said transfer time to respective input ports;
determine an address in each of said transit memory devices from which address a data segment is to be transferred to an output port during each time slot in said time-slotted frame; and
communicate said address to said each of said transit memory devices.

2. The switch of claim 1 wherein said primary memory divisions are arranged into memory blocks each memory block including one primary memory division from each transit-memory device.

3. The switch of claim 2 wherein each of said memory blocks is allocable to hold a data block written by a single input port and destined to at least one output port.

4. The switch of claim 3 wherein data segments in said data block are transferred from said single input port to said plurality of transit memory devices in temporal alignment, where said single input port transfers a first data segment of said data block at a reference time-slot of said time-slotted frame.

5. The switch of claim 3 wherein data segments in said data block are transferred from said single input port to said plurality of transit memory devices in spatial alignment, where said single input port transfers a first data segment of said data block to a reference transit-memory device.

6. The switch of claim 1 wherein each of said input ports is adapted to determine a flow rate $\rho$ for each data stream from a plurality of data streams, assign said each data stream to a preferred group from said first group and said second group according to said flow rate, and communicate an identifier of said preferred group to said master controller.

7. The switch of claim 6 wherein said at least one input port selects said first group when the flow rate ρ exceeds a predetermined flow-rate threshold ρ*.

8. The switch of claim 7 wherein said flow-rate threshold is determined as:

$$\rho^* = N \times R \times \delta / d,$$

where N is the number of input ports in said plurality of input ports, R is a flow rate limit of each of said input ports, δ is the access time of each of said transit-memory devices, and d is a delay tolerance of said each data stream.

9. The switch of claim 1 wherein each of said input ports is adapted to determine a delay tolerance τ for each data stream from a plurality of data streams and assign said each data stream to said first group if said delay tolerance exceeds a predetermined threshold.

10. A switch comprising:
a plurality of input ports for receiving input data and organizing said input data into data segments;
a plurality of output ports;
a plurality of transit memory devices;
a plurality of transit-memory controllers, each transit-memory controller associated with a specific transit memory device;
an input rotator operable to cyclically connect each input port to each transit memory device;
an output rotator operable to cyclically connect each transit memory device to each output port; and
a master controller communicatively coupled to each of said input ports and each of said transit-memory controllers;
wherein each transit-memory controller is further operable to reserve a prescribed number of floating memory divisions in said specific transit memory device, each floating memory division for receiving from any input port a data segment destined to at least one output port;
wherein said master controller is operable to allocate at least one array of floating memory divisions, each array including one floating memory division from each transit memory device, for transferring a data block from a selected input port to at least one output port, said data block including a number of data segments not exceeding the number of said transit memory devices, thereby realizing exclusive-access switching; and
wherein each of said input ports transfers data at a rate R limited to:

$$R \leq (\Omega/\delta) \times (1 - N \times (N-1) \times \delta / D)$$

where δ the time required to access any of said transit memory devices to write and read a data segment, Ω the number of bits per data segment, D is a permissible data segment queueing delay at any of the input ports, and N is the number of input ports.

11. The switch of claim 10 wherein each transit-memory controller is operable to allocate a dedicated memory division in said specific transit memory device to each output port for receiving from any input port a data segment destined to said each output port, thereby realizing concurrent-access switching.

12. The switch of claim 10 wherein said master controller is further operable to determine:

input-port-specific schedules for data transfer from said input ports, through said input rotator, to said transit memory devices; and
transit-memory-specific schedules for data transfer from said transit memory devices, through said output rotator, to said plurality of output ports.

13. The switch of claim 12 wherein said master controller is further operable to communicate said input-port-specific schedules to corresponding input ports and said transit-memory-specific schedules to corresponding transit-memory controllers.

14. The switch of claim 10 wherein each input port further identifies each data segment according to a data type and communicates an identifier of said each data type to the master controller.

15. The switch of claim 14 wherein said data type is one of: aperiodic data segments, periodic data segments, and data blocks each of which data blocks comprising a data segment in each of said transit memory devices.

16. The switch of claim 15 wherein said master controller further includes a release-rate regulation device operable to select one of said data blocks for each of the output ports during each rotator cycle.

17. The switch of claim 15 wherein at least one of said data blocks contains information bits and null bits and only the information bits in each data block among said at least one of said data blocks are transmitted from each of the output ports.

18. The switch of claim 17 wherein transfer of a specific data block among said at least one of said data blocks to an output port is rate regulated according to information-bit content of said specific data block.

19. The switch of claim 10 wherein said master controller is further operable to:
receive from at least one of the input ports flow-rate-allocation requests for data-streams, each data stream associated with an output port;
determine a permissible transfer rate in response to each of said flow-rate-allocation requests based on a known capacity of each output port; and
communicate said permissible transfer rate to said each of said at least one of the input ports.

20. The switch of claim 10 wherein said input rotator periodically repeats an input-configuration cycle, said input configuration cycle comprising a predefined sequence of input transfer configurations.

21. The switch of claim 10 wherein said output rotator periodically repeats an output-configuration cycle, said output-configuration cycle comprising a predefined sequence of output transfer configurations.

22. The switch of claim 10 wherein each of said transit memory devices is organized to hold data segments directed to a multiplicity of output ports, said data segments having the same size.

23. The switch of claim 22 wherein each transit-memory controller arranges pointers to data segments held in its associated transit memory device so that pointers of data segments directed to the same output port form a linked list.

24. The switch of claim 10 wherein at least one of said transit-memory controllers is further adapted to provide multiple pointers for a single data segment held in a transit memory device.

25. The switch of claim 24 wherein each of said single data segments is deleted when addressed by all of the multiple pointers.

* * * * *

UNITED STATES PATENT AND TRADEMARK OFFICE
CERTIFICATE OF CORRECTION

PATENT NO.       : 7,639,678 B2                                    Page 1 of 1
APPLICATION NO.  : 11/002398
DATED            : December 29, 2009
INVENTOR(S)      : Maged E. Beshai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1398 days.

Signed and Sealed this

Ninth Day of November, 2010

David J. Kappos
*Director of the United States Patent and Trademark Office*